(12) United States Patent
Matsuzawa et al.

(10) Patent No.: US 8,131,783 B2
(45) Date of Patent: Mar. 6, 2012

(54) STORAGE SYSTEM, VOLUME MANAGEMENT METHOD, AND MANAGEMENT COMPUTER

(75) Inventors: Keiichi Matsuzawa, Yokohama (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 444 days.

(21) Appl. No.: 12/385,834

(22) Filed: Apr. 21, 2009

(65) Prior Publication Data

US 2010/0211620 A1    Aug. 19, 2010

(30) Foreign Application Priority Data

Feb. 18, 2009   (JP) .................................. 2009-035236

(51) Int. Cl.
*G06F 17/30* (2006.01)
(52) U.S. Cl. ...................................................... 707/822
(58) Field of Classification Search ................... 707/204
See application file for complete search history.

(56) References Cited

U.S. PATENT DOCUMENTS

| 7,330,950 | B2 | 2/2008 | Matsunami et al. | |
| 2005/0091455 | A1* | 4/2005 | Kano et al. | 711/114 |
| 2006/0129537 | A1 | 6/2006 | Torii et al. | |

FOREIGN PATENT DOCUMENTS

| JP | 2003-015915 | 7/2001 |
| JP | 2006-164211 | 3/2005 |
| JP | 2006-216070 | 3/2006 |

* cited by examiner

*Primary Examiner* — Truong Vo
(74) *Attorney, Agent, or Firm* — Stites & Harbison PLLC; Juan Carlos A. Marquez, Esq.

(57) ABSTRACT

A storage system for optimizing volume capacity among file management computers of sharing a storage apparatus is provided. A capacity management computer acquires statistical information such as access history information from the file management computers and the storage apparatus. The capacity management computer executes a capacity optimizing process for the storage apparatus in association with a specified date. The capacity management computer calculates optimized capacity for the respective file systems based on the statistical information by redistributing available capacity of volumes according to a predetermined standard such as a capacity consuming speed. Further, the capacity management computer instructs the file management computers and the storage apparatus to optimize a size of the file systems and the capacity of the volumes, respectively.

10 Claims, 15 Drawing Sheets

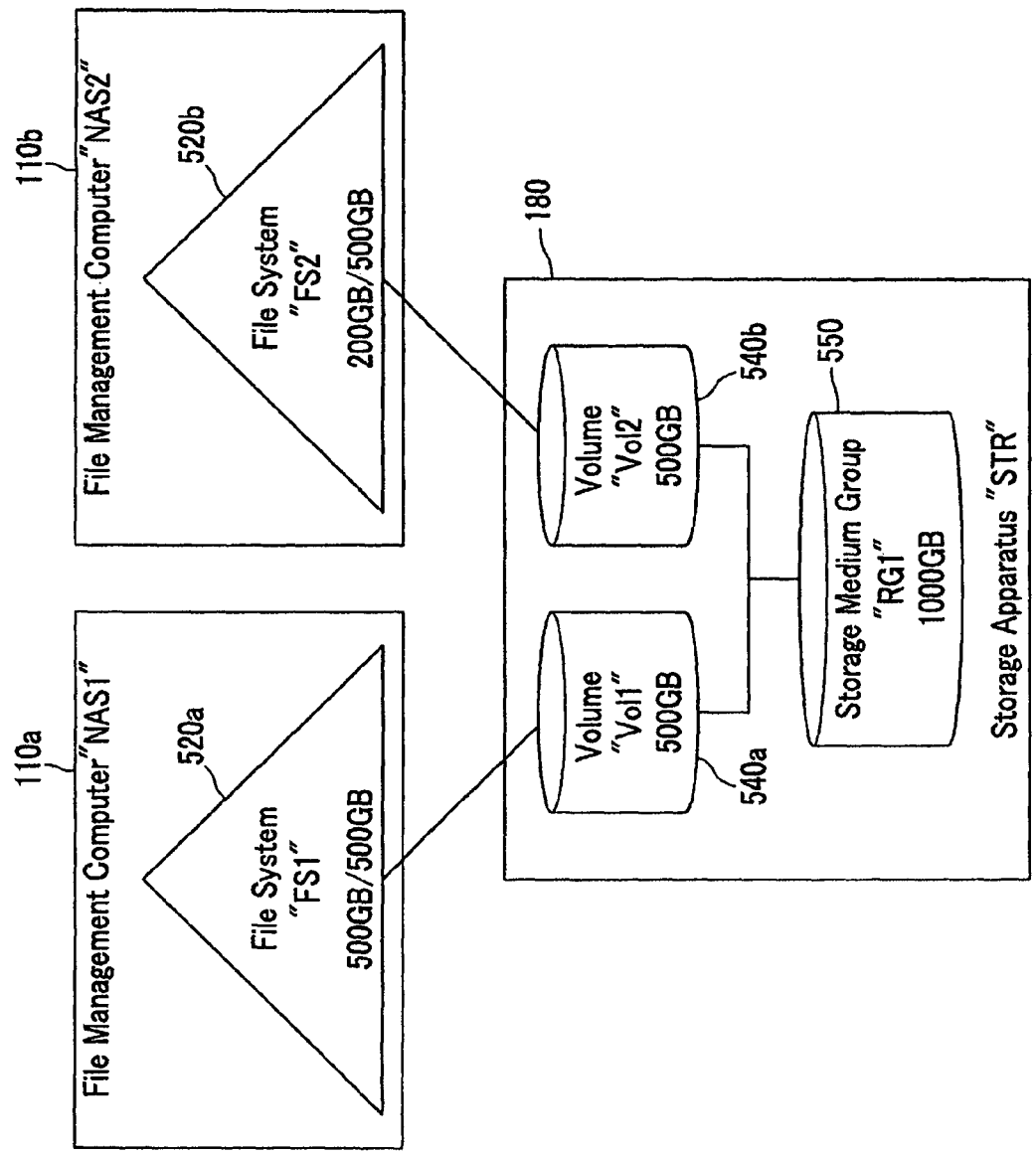

FIG. 6A

600 File System Statistical Information Table

| Node ID | File System ID | Volume ID | Capacity Changeable Index | Total Capacity | Available Capacity | Capacity Consuming Speed |
|---|---|---|---|---|---|---|
| NAS1 | FS1 | Vol1 | OK | 500GB | 0GB | 200MB/day |
| NAS2 | FS2 | Vol2 | OK | 500GB | 300GB | 100MB/day |

650 Storage Apparatus Statistical Information Table

| Storage Apparatus ID | Storage Medium ID | Max Performance | Volume ID | Capacity | Allocated Destination Node ID |
|---|---|---|---|---|---|
| STR | RG1 | 300MB/s | Vol1 | 500GB | NAS1 |
|  |  |  | Vol2 | 500GB | NAS2 |

600A File System Statistical Information Table

| Node ID | File System ID | Volume ID | Capacity Changeable Index | Total Capacity | Available Capacity | Current Performance | Required Performance |
|---|---|---|---|---|---|---|---|
| NAS1 | FS1c | Vol1a | OK | 500GB | 0GB | 200MB/s | 300MB/s |
|  |  | Vol2a | OK | 2000GB | 1500GB |  |  |
| NAS2 | FS2c | Vol1b | OK | 500GB | 0GB | 150MB/s | 150MB/s |
|  |  | Vol2b | OK | 2000GB | 1000GB |  |  |

FIG. 11B

650A Storage Apparatus Statistical Information Table

| Storage Apparatus ID | Storage Medium ID | Max Performance | Volume ID | Capacity | Allocated Destination Node ID |
|---|---|---|---|---|---|
| STR | RG1 | 400MB/s | Vol1a | 500GB | NAS1 |
|  |  |  | Vol1b | 500GB | NAS2 |
|  | RG2 | 200MB/s | Vol2a | 2000GB | NAS1 |
|  |  |  | Vol2b | 2000GB | NAS2 |

STORAGE SYSTEM, VOLUME MANAGEMENT METHOD, AND MANAGEMENT COMPUTER

CROSS REFERENCE TO RELATED APPLICATIONS

This application claims the foreign priority benefit under Title 35, United State Code, 119 (a)-(d) of Japanese Patent Application No. 2009-035236, filed on Feb. 18, 2009 in the Japan Patent Office, the disclosure of which is herein incorporated by reference in its entirety.

BACKGROUND OF THE INVENTION

1. Field of the Invention

The present invention relates to a storage system for optimizing volume capacity among file management computers sharing a storage apparatus, a capacity management method, and a management computer.

2. Description of Related Art

Recently, several patent documents have disclosed an automatic volume expanding technology as a basic function of a storage apparatus. According to Japanese Laid-Open Patent Application No. 2003-15915, in a volume pool containing a plurality of virtual volumes, when a virtual volume is prepared, a physical block is not allocated to the block constituting the virtual volume. When an actual usage request (i.e., write I/O request) is issued, the physical block is allocated to the requested block from the volume pool. By using the automatic volume expanding technology, an administrator becomes free from a capacity expanding operation of the virtual volumes, since what the administrator should operate is only to monitor availability of the volume pool by keeping the capacity of the virtual volume in a sufficiently large size and having the capacity of the volume pool in an appropriate size.

Further, in addition to the volume expanding technology, a volume changing technology is disclosed, which changes volumes stored in the storage apparatus corresponding to a property of a file. For example, according to Japanese Laid-Open Patent Application No. 2006-216070, the storage apparatus classifies the volumes to respective storage tiers called storage classes, in association with a property of a disk constituting the volumes. According to the patent document as mentioned above, in a file system built on the volumes, it is possible to make a file migrate among the different storage classes in association with a dynamic property and a static property of the storage class. Furthermore, it is possible to conceal a change in a file location associated with a file migration, by making a host computer, which refers to the file system through a network, capable of specifying the file by the same file path before and after the file migration.

Moreover, Japanese Laid-Open Patent Application No. 2002006-164211 discloses a concealing technology for concealing a change in a file location caused by the file migration, similarly to Japanese Laid-Open Patent Application No. 2006-216070. The technology described in Japanese Laid-Open Patent Application No. 2006-164211 is different from the technology described in Japanese Laid-Open Patent Application No. 2006-216070, in a point that the latter conceals a file migration among a plurality of computers managing the file systems, while the former conceals the file migration among volumes/file systems with different properties.

For operation and management of the storage apparatus, it is an important and major target to manage performance and capacity of the storage apparatus. Generally, the performance and the capacity of the storage apparatus can be improved by adding storage media such as an HDD (Hard Disk Drive), a tape, and a flash memory. However, addition of the storage media leads to increase in a management cost for an installation area, consuming electric power, and an MTTF (Mean Time To Failure) of the whole storage apparatus as well as an introduction cost of devices. On the other hand, whole capacity and whole performance of the storage apparatus are not used in general. For example, it is told that a usage rate of the capacity for the large storage apparatus, is about 35% in a company.

Because of these factors as mentioned above, if available capacity becomes insufficient in a part of a plurality of volumes provided by the storage apparatus, although the other volumes have the available capacity, addition of the storage media is needed due to insufficient performance and available areas.

There is the same issue in case of a file system built on the volume provided by the storage apparatus. For a general file system, in preparation of the file system, the file system is prepared to have the same capacity size as that of the volume. Then, file data, file management information, and information for managing a usage status of the storage apparatus are stored in the volume. Therefore, if a total size of all files stored in a file system is smaller than the size of that file system, that file system has available capacity. However, if the whole capacity of the volume is already used, the volume has no available capacity. Accordingly, if a file system is short of performance and capacity, addition of the storage media to the file system is needed, even though another file system has available capacity.

Here, if there is available capacity in a file system and the available capacity is made capable of being used by another file system, it is possible to solve a shortage problem of the capacity without adding the storage media, and increase the usage rate of the storage apparatus.

As to a solution of the above mentioned problem, there is a method for reducing the usage rate of the volume by reducing a file system in operation having available capacity. Further, it is possible to solve the shortage problem of the available capacity by allocating the volume capacity not in use, which is not used by the file system, to the file system having no available capacity. However, generally, reduction of the file system is a process to put a heavy load on the storage apparatus due to necessity of data rearrangement in the volume. Therefore, the reduction of the file system should not be conducted frequently.

SUMMARY OF THE INVENTION

It is an object of the present invention to decrease a frequency of the reduction of the file system, and to improve a usage rate of the storage apparatus by distributing available capacity with reducing an overhead in performance. Herein, the overhead represents a process needed indirectly and additionally when the process is carried out, and a size of the load caused by the process.

Further, the present invention solves another problem. There is a case that volume capacity used by another file system is needed besides a case short of capacity. For example, when there are two file systems using high speed volumes with high access speeds, and a plurality of file systems using low speed volumes with low access speeds, it is assumed that two computers use two file systems on the high speed volumes, respectively.

If a computer A needs more capacity of the high speed volume due to a performance issue, the computer A needs available capacity to be distributed from the high speed volume used by the other computer B. Herein, even if there is no available capacity in the file system, reduction of the file system can not be conducted. Hereby, if the computer B uses the whole capacity of the file system on the high speed volume, the available capacity of the high speed volume can not be distributed to the computer A, even if the computer B does not need such a high performance volume. This kind of problem is liable to happen, when a capacity arrangement is performed among volumes/file systems whose reliability and function in addition to performance are different.

Accordingly, it is another object of the present invention to distribute a part of the available capacity in the volume used by the file system having the specific property to another file system having the same property, even if the whole capacity of the file system using the volume is already used.

In order to solve the above mentioned problems, a management computer (i.e., capacity management computer 120) of the storage system collects information of a file system on performance, function and previous capacity changing history, for a file system group sharing a storage apparatus. The management computer estimates a time until available capacity of the respective file systems comes to be insufficient, and calculates capacity of the file system, which mostly elongates the time to cause a shortage of the available capacity. Then, the management computer executes reducing and expanding processes of the respective file systems.

Further, the management computer calculates capacity of the file system in the respective properties by using the information collected as mentioned above, in a configuration where there are a plurality of volumes/file systems in different properties. Then, the management computer calculates the optimized capacity of the file system so as to efficiently utilize the properties of the volumes/file systems for the whole system.

If a file system needs only a smaller capacity than the current capacity, the management computer makes a file in the file system migrate to a file system having a different property to increase the available capacity in the file system. Further, the management computer reduces the file system whose available capacity is made increased, and optimizes the capacity of the whole system by allocating the volume capacity coming to be unused, to another file system.

According to the present invention, in a file system group of sharing a storage apparatus, it is possible to optimize capacity configuration of the file systems in the whole system, reducing a load accompanied by a capacity change of the file system.

Further, if the storage apparatus has volumes/file systems with different properties as mentioned above, it is possible to distribute the capacity among the volumes/file systems so as to optimize effects of good properties in the whole system.

BRIEF DESCRIPTION OF THE DRAWINGS

FIG. 5 is a block diagram showing an example of an operation mode of the storage system in the first embodiment.

FIGS. 6A and 6B are explanatory diagrams showing examples of an access information table in the first embodiment.

FIGS. 11A and 11B are explanatory diagrams showing examples of an access information table in the second embodiment.

DETAILED DESCRIPTION OF THE PREFERRED EMBODIMENT

While the best mode for carrying out the present invention will be explained in detail in reference to diagrams, the present invention is not limited to such mode.

First Embodiment

Hereinafter, a first embodiment of the present invention will be explained.

Figure 1:
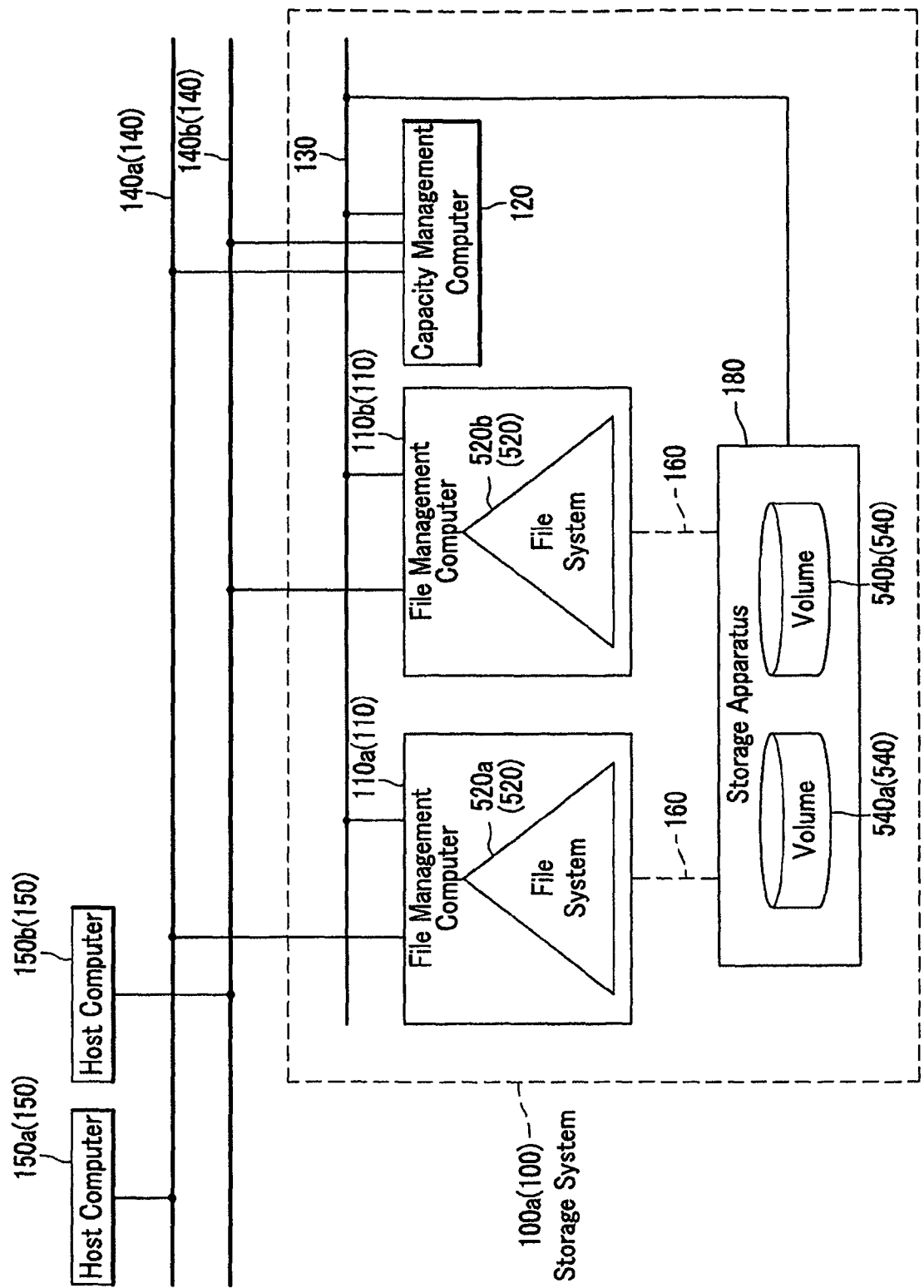
FIG. 1 is a block diagram showing an example of configuration of a computer system including a storage system in the first embodiment.

FIG. 1 is a block diagram showing a configuration example of a computer system including a storage system in the first embodiment. As shown in FIG. 1, the storage system 100a (100) comprises file management computers 110a (110) and 110b (110), a storage apparatus 180, a capacity management computer 120, wires 160, and a management network 130 for management. The storage system 100a (100) provides a file storage function to host computers 150a (150) and 150b (150) which are coupled to data networks 140a (140) and 140b (140). The file management computers 110a and 110b, which are applicable subject matters of the present invention, are computers provided with file systems 520a (520) and 520b (520) respectively. The storage apparatus 180 has a storage medium and provides a storage area with the file management computers 110a and 110b. Here, the file systems 520 will be explained later referring to FIG. 5.

The file managements computers 110a and 110b are coupled to the storage apparatus 180 via the wires 160, and shares the storage apparatus 180. Here, the file management computers 110a and 110b do not always need the two wires 160 as shown in FIG. 1, and can share the single wire 160 each other. For example, if the file management computers 110a and 110b are coupled to the storage apparatus 180 via FCs (Fibre Channels), the file management computers 110a and 110b can share the wire 160 coupling to the storage apparatus

180 by inserting an FC-SW (Switch) between the FCs and the wire 160. Additionally, with respect to the wire 160, communication types such as iSCSI (internet Small Computer System Interface) and FCoE (Fibre Channel on Ethernet®) can be available. Further, the file management computers 110*a* and 110*b*, the capacity management computer 120, and the storage apparatus 180 are coupled to the management network 130, to use the management network as a communication path of management information and file data.

The file management computers 110*a* and 110*b* manage the storage apparatus 180 by transmitting the management information to the storage apparatus 180 through the management network 130 or the wires 160.

The volume management computer 120 manages the storage apparatus 180 by transmitting the management information to the storage apparatus 180 through the management network 130. Further, the capacity management computer 120 indirectly manages the storage apparatus 180 by controlling the file management computers 110*a* and 110*b* through the management network 130.

The file managements computers 110*a* and 110*b* prepare file systems 520*a* and 520*b* respectively on volumes 540*a* (540) and 540*b* (540) which are provided by the storage apparatus 180. A user can perform such operations as file preparation, file deletion and file read/write, through input/output (I/O) devices coupling to the file management computers 110*a* and 110*b*. Furthermore, since the file management computers 110*a* and 110*b* are coupled to the data networks 140*a* and 140*b* respectively, the host computers 150*a* and 150*b* can operate the file preparation, the file deletion and the file read/write through the data networks 140*a* and 140*b*.

For example, protocols such as a TCP/IP (Transmission Control Protocol/Internet Protocol) and a NetBEUI (NetBIOS Extended User Interface) are available to communicate among the computers. Further, an NFS (Network File System) and a CIFS (Common Internet File System) are available for protocols requesting a file access on these communication protocols.

The capacity management computer 120 communicates with the file management computers 110*a* and 110*b*, and the storage apparatus 180 through the management network 130. The capacity management computer 120 is a main body of the present invention for processing reception of statistical data and transmission of management data. Further, the capacity management computer 120 can be coupled to the data networks 140*a* and 140*b*, and receive the statistical data from other apparatuses which are coupled to the data networks 140*a* and 140*b*.

Figure 2:
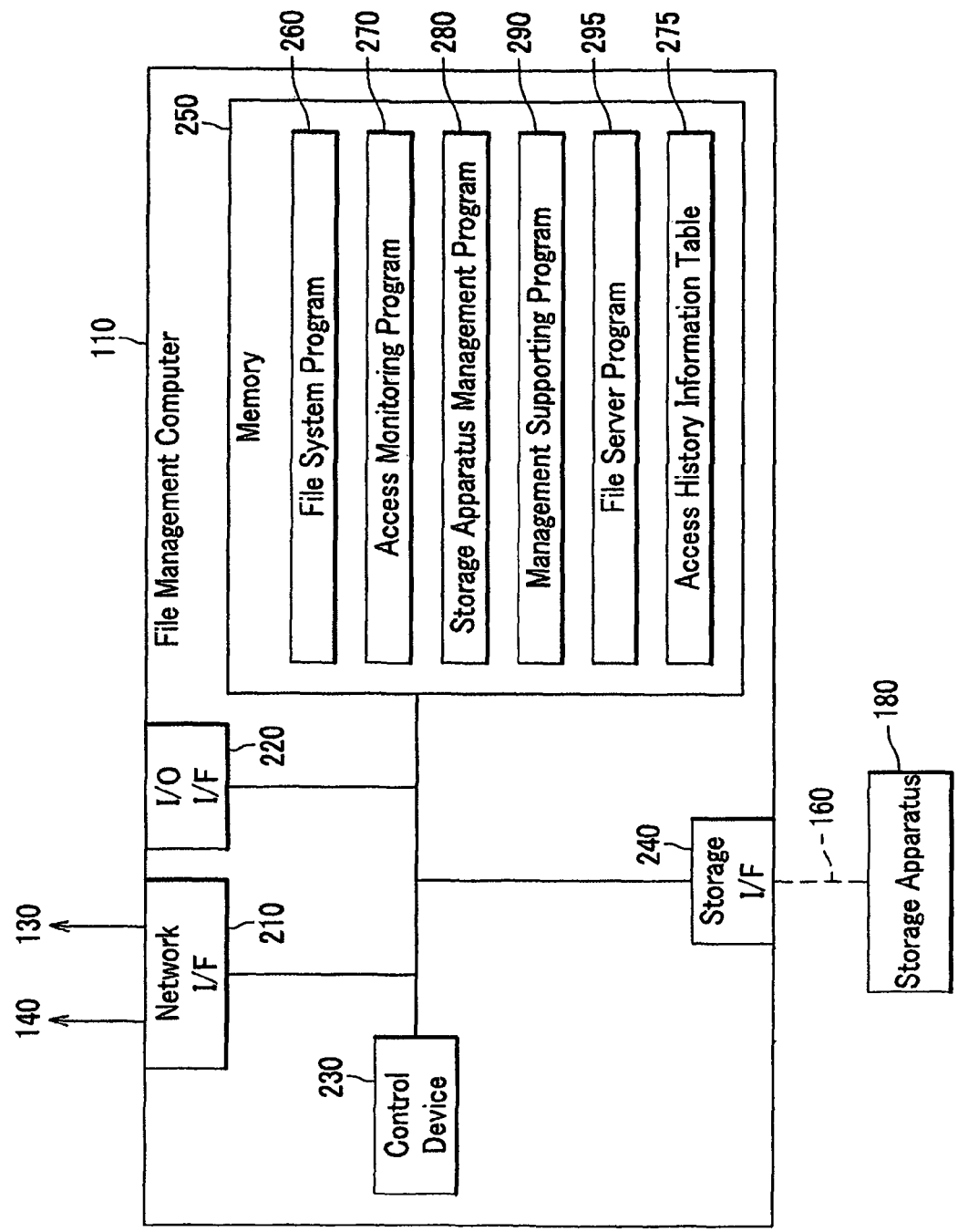
FIG. 2 is a block diagram showing an example of the detailed configuration of a file management computer.

FIG. 2 is a block diagram showing an example of detailed construction of the file management computer. The file management computer 110 comprises a control device 230, a memory 250, a network interface 210 (network I/F), and a storage interface 240 (storage I/F). Further, the file management computer 110 can include an input/output interface 220 (I/O I/F). The file management computer 110 communicates with the storage apparatus 180 through the storage interface 240, and performs input/output processing to a volume provided by the storage apparatus 180, and controls the storage apparatus 180.

Furthermore, the file management computer 110 communicates with a computer coupled to the management network 130 and the data networks 140*a* and 140*b* by protocols such as the TCP/IP and the NetBEUI through the network interface 210. Moreover, the file management computer 110 accepts a file access request by the NFS and the CIFS.

The control device 230 controls the file management computer 110 by operation according to programs stored in the memory 250. The memory 250 comprises a file system program 260, an access monitoring program 270, a storage apparatus management program 280, a management supporting program 290, a file server program 295, and an access history information table 275.

The file system program 260 stores data in a file format on the volume provided by the storage apparatus 180 to provide a function that a user of the file management computer 110 can operate the data on the volume in the file format. The file system program 260 manages each file by adding a proper name including a numeral, a character string and a symbol string. The user of the file management computer 110 can specify an operating target file by inputting the file name to the file management computer 110. The access monitoring program 270 monitors an operation of the file system program 260, information processed by the storage interface 240 and the network interface 210, and stores statistical information such as a data amount in the access history information table 275.

The storage apparatus management program 280 is a program for instructing the storage apparatus 180 to add/delete volumes and change capacity. The management supporting program 290 is a program for executing the access monitoring program 270 and the storage apparatus management program 280, and returning contents of the access history information table 275 to other computers, in response to a management request transmitted from the other computers through the network interface 210.

Further, the memory 250 has the file server program 295. The file server program 295 is a program for performing a file operation by calling the file system program 260, corresponding to a file operation request transmitted by protocols such as the NFS and the CIFS through the network interface 210.

The I/O interface 220 is coupled to a key board, a mouse, a display and a printer. By the I/O inter face 220, the user of the file management computer 110 manages the file management computer 110, and operates a file on the file system managed by the file management computer 110.

Figure 3:
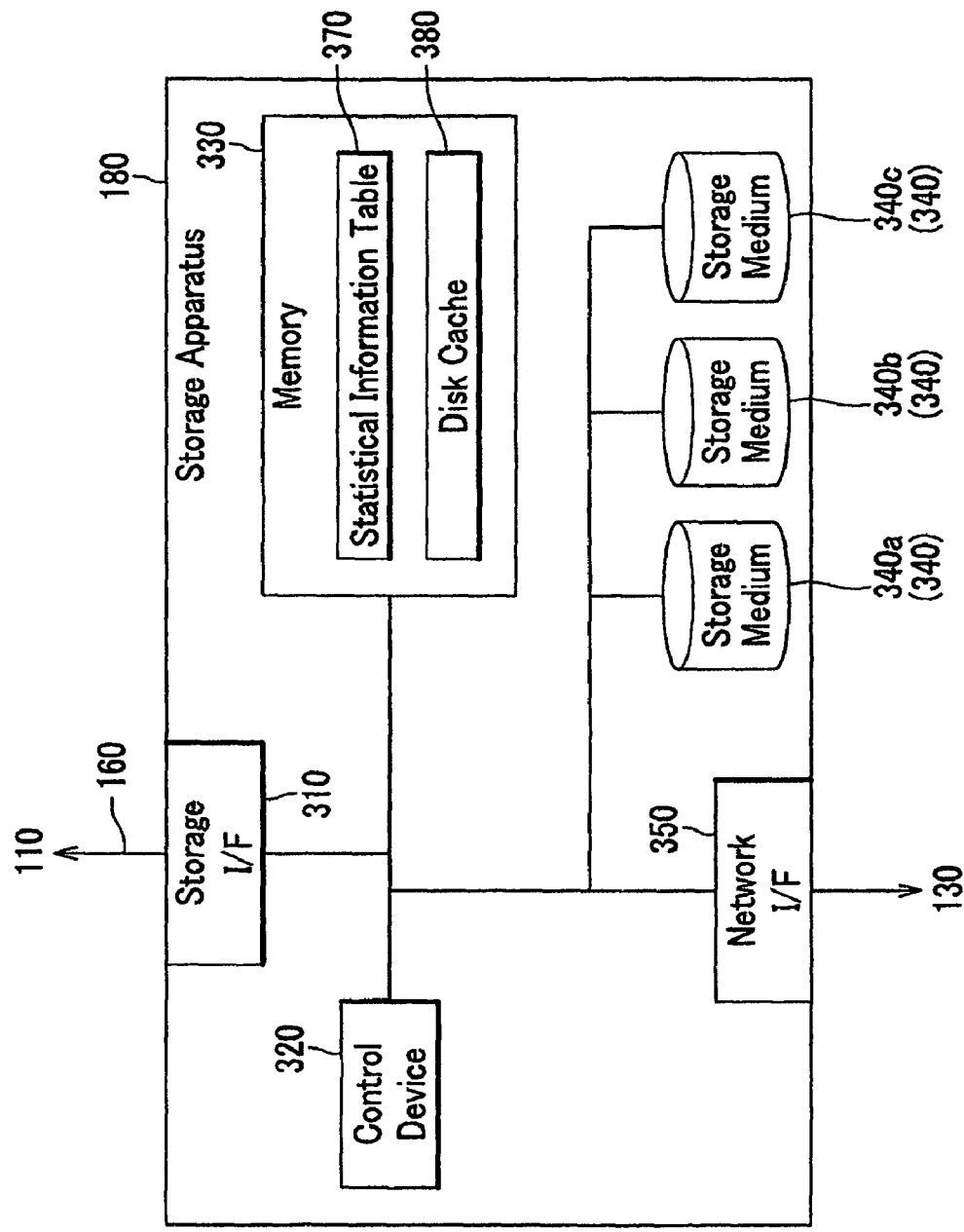
FIG. 3 is a block diagram showing an example of the detailed configuration of a storage apparatus.

FIG. 3 is a block diagram showing an example of detailed construction of the storage apparatus. The storage apparatus 180 comprises a control device 320, a storage interface 310 (storage I/F), a memory 330, and storage media 340*a* (340), 340*b* (340) and 340*c* (340). Further, the storage apparatus 180 may have a network interface 350 (network I/F).

The control device 320 constitutes volumes by extracting a part of the capacity from one or a plurality of the storage media 340, and notifies a computer, which is coupled to the wire 160 through the storage interface 310, of information on a volume ID and capacity. Hereby, the computer coupled to the wire 160 through the storage interface 310 can uniquely specify a storage location of data by specifying the volume ID and the location in the volume, if the computer inputs/outputs the data to the storage apparatus 180. The control device 320 can operate the respective storage media 340*a* to 340*c* as a single volume. Further, when the control device 320 receives control information from the computer coupled to the wire 160 through the storage interface 310, the control device 320 controls the respective factors in the storage apparatus 180 corresponding to contents of the control information.

With respect to the storage media 340, devices which can store information such as a magnetic disk like an HDD, an optical disk like a DVD (Digital Versatile Disk), a tape device, a flash memory, an SSD (Solid State Drive), and a disk array device including a plurality of the HDDs and controllers can be used for the storage media 340. Further, a plurality of the storage apparatuses 180 can constitute a tier structure by using another storage apparatus 180 different from the storage apparatus 180 having the storage media 340. All of the storage media 340 are not always needed to be the same media. For example, the storage media 340 can be comprised of media having a different speed, capacity and property and their combination.

The storage apparatus 180 uses a part of the memory 330 as a disk cache 380. The memory 330 uses the disk cache 380 as a cache area for pre-reading information stored in the storage media 340 and delaying write in the storage media 340.

Further, the storage apparatus 180 includes a statistical information table 370 in the memory 330. The statistical information table 370 stores use information on the volume in the storage apparatus 180, and statistical information on amounts of a utilized cache memory and processed input/output.

Further, when the storage apparatus 180 includes the network interface 350, the storage apparatus 180 can transmit/receive the control information on the storage apparatus 180 and contents of the statistical information table 370, from the computer coupled to the management network 130 through the network interface 350.

Figure 4:
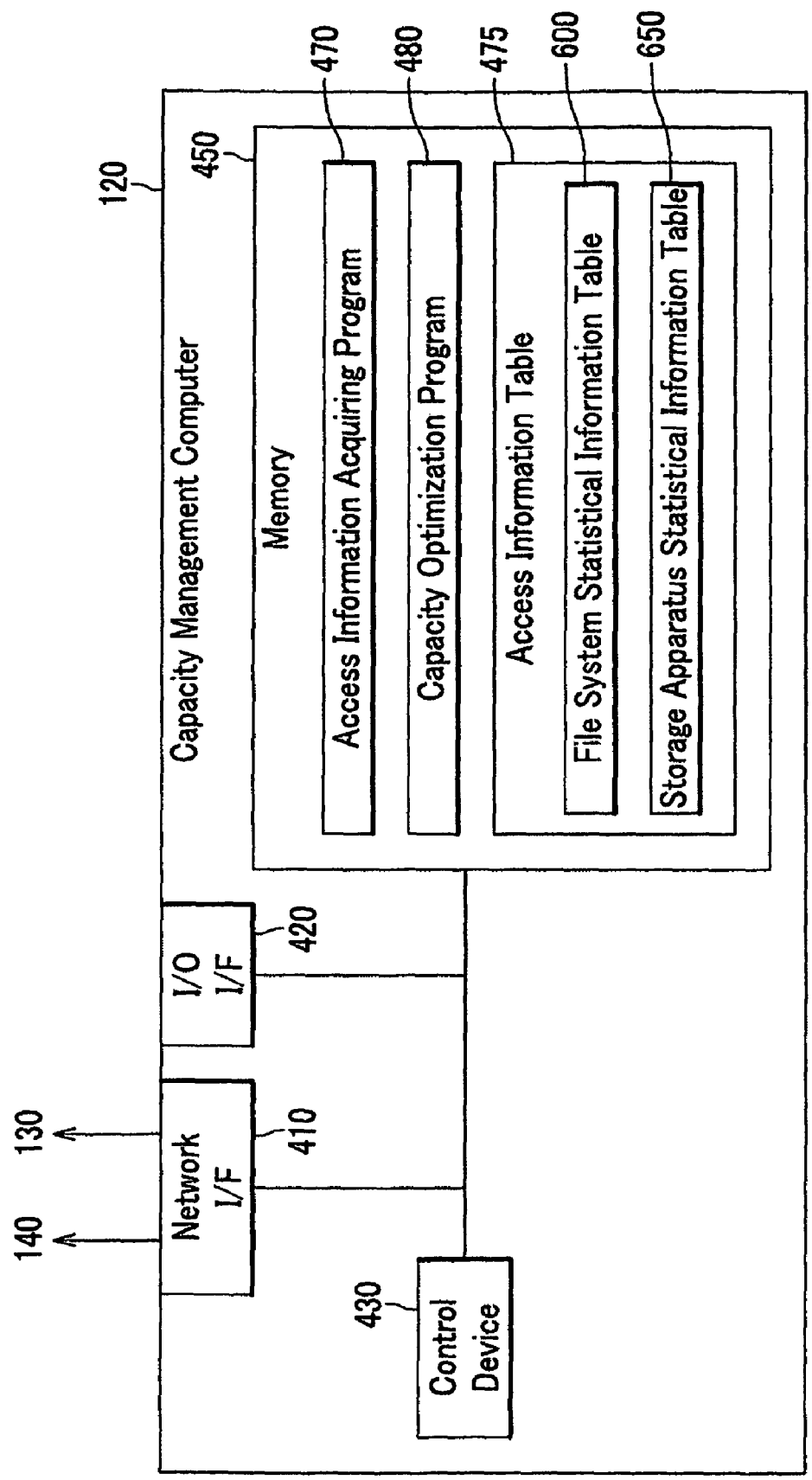
FIG. 4 is a block diagram showing an example of the detailed configuration of a capacity management computer.

FIG. 4 is a block diagram showing an example of a detailed configuration of the capacity management computer. The capacity management computer 120 includes a control device 430, a memory 450, and a network interface 410 (network I/F). Additionally, the volume management computer 120 includes an I/O interface 420 (input/output I/F).

The capacity management computer 120 is coupled to the management network 130 through the network interface 410, by which a user of the capacity management computer 120 can operate the capacity management computer 120 from another computer coupled to the management network 130. Further, the user of the capacity management computer 120 can operate the capacity management computer 120 via the I/O interface 420.

The control device 430 controls the capacity management computer 120 by operating according to programs stored in the memory 450. The memory 450 includes an access information acquiring program 470 (statistical information acquiring program), a capacity optimization program 480 (allocated capacity calculating program) and an access information table 475.

The access information acquiring program 470 is a program for acquiring the access history information table 275 included in the file management computer 110 and the statistical information table 370 included in the storage apparatus 180 through the network interface 410, and processing the statistical information table 370 to store it in the access information table 475. The access information acquiring program 470 collects statistic information from a computer coupled to the management network 130 besides the file management computer 110 and the storage apparatus 180, and stores the statistical information in the access information table 475. The access information table 475 includes, specifically, a file system statistic information table 600 described hereinafter (see FIG. 6A) and a storage apparatus statistical information table 650 (see FIG. 6B).

The capacity optimization program 480 is a program for referring to the access information table 475, calculating optimized capacity in a volume which is allocated to the respective file management computers 110 by the storage apparatus 180, and further instructing the file management computer 110 and the storage apparatus 180 to change the capacity based on the calculated result.

In FIGS. 1 and 4, the capacity management computer 120 is described as an independent computer. However, if the file management computer 110 and the storage apparatus 180 have respective factors constituting the capacity management computer 120, the file management computer 110 and the storage apparatus 180 can operate as the capacity management computer 120. For example, the file management computer 110 can operate as the capacity management computer 120 by including the control device 230, the memory 250, the network interface 210, the I/O interface 220, in which the memory 250 further includes the access information acquiring program 470, the access information table 475, the capacity optimization program 480, and the system management program 490.

FIG. 5 is a block diagram showing an example of an operation mode of the storage system in the first embodiment. In the storage system 100a (refer to FIG. 1), the file management computer 110a having an ID of NAS1 and the file management computer 110b having an ID of NAS2 share a single storage apparatus 180 having an ID of STR. The storage apparatus 180 includes a storage medium group 550 having an ID of RG1, in which two volumes 540a and 540b having names of Vol1 and Vol2 are prepared. In the example, the storage medium group 550 has 1000 GB capacity, in which the volumes 540a and 540b respectively have 500 GB capacity on halves. Herein, a file system 520a consumes more capacity than a file system 520b since the file system 520a receives more file access requests than the file system 520b.

The file management computer 110a prepares the file system 520a having an ID of FS1 on the volume 540a. The file system 520a already uses all of the capacity against the whole capacity 500 GB. Hereby, the file system 520a can not store additional files, being incapable of carrying on continuous operation. Herein, 500 GB/500 GB represents consumed capacity/allocated capacity, which represents that 500 GB is consumed (used) against the allocated capacity 500 GB.

The file management computer 110b prepares the file system 520b having an ID of FS2 on the volume 540b. The file system 520b already uses 200 GB against the whole capacity 500 GB.

FIG. 6 is an explanatory diagram showing an example of the access information table. Simultaneously, FIGS. 1 and 4 will be referred appropriately. The access information table 475 included in the capacity management computer 120 includes a file system statistic information table 600 shown in FIG. 6A and a storage apparatus statistical information table 650 shown in FIG. 6B.

The file system statistic information table 600 is a kind of the access information table 475, which is produced by the access information acquiring program 470 of the capacity management computer 120 by collecting the access history information table 275 of the file management computers 110a and 110b. The file system statistical information table 600 stores one line data 620 and 621 for one file system in the storage system 100a. The file system statistical information table 600 has a file system ID 612 (identification data (ID) of the file system). Additionally, the file system statistic information table 600 includes a node ID 611 which specifies a file management computer having the file system, a volume ID 613 (identification data (ID) of the volume) which indicates the volume preparing the file system, a capacity changeable index 614 (flag) which indicates whether a capacity change in the file system is possible or not, whole capacity 615 of the file system (allocated capacity of the volume), and available capacity 616 which indicates an unused area of the file system. Further, the file system statistic information table 600 stores a capacity consuming speed 617 of the respective file systems.

Specifically, according to the data 620, it is shown that the file system FS1 (520*a*) uses the volume Vol1 (540*a*) and has no available capacity (0 GB) against the whole capacity 500 GB, with the capacity consuming speed of 200 MB/day. Further, according to the data 621, it is shown that the file system FS2 (520*b*) uses the volume Vol2 (540*b*) and has the available capacity 300 GB against the whole capacity 500 GB, and the capacity consuming speed is 100 MB/day.

Here, above-mentioned information on the file system statistic information table 600 is shown as an example. The file system statistic information table 600 can store other information, for example, detailed information on an access frequency and a capacity consumption of a file per dates.

The storage apparatus statistical information table 650 is a kind of the access information table, which is produced by the access information acquiring program 470 in the capacity management computer 120 by collecting the statistical information table 370 in the storage apparatus 180. The storage apparatus statistical information table 650 stores one line data 670 and 671 for one volume in the storage system 100*a*. The storage apparatus statistical information table 650 stores statistical information on the respective volumes such as a storage apparatus ID 661, a storage medium ID 662, a maximum performance of the storage medium 663, a volume ID 664, volume capacity 665, and an allocated destination node ID 663: the allocated destination to which the volume being allocated.

Specifically, according to the data 670, it is shown that a maximum performance of the storage medium group RG1 (550) in the storage apparatus STR (180) is 300 MB/s, and that 500 GB capacity is allocated to the volume Vol1 (540*a*) for the file management computer NAS1 (110*a*) and 500 GB capacity is allocated to the volume Vol2 (540*b*) for the file management computer NAS2 (110*b*).

Above-mentioned information on the storage apparatus statistic information table 650 is shown as an example. Herein, the storage apparatus statistical information table 650 can store other information, for example, detailed information on a response time, a consuming electric power, an input/output amount of a volume per dates.

Further, the access information table 475 can store not only the file system statistical information table 600 and storage apparatus statistical information table 650, but also statistical information on the storage system 100*a*. For example, a usage rate of the control device in the file management computers 110*a* and 110*b*, a band activity rate of the wire 160, a usage status of the disk cache 380 in the storage apparatus 180 can be stored.

Next, processing steps will be explained.

(Access Information Acquiring Process)

Figure 7:
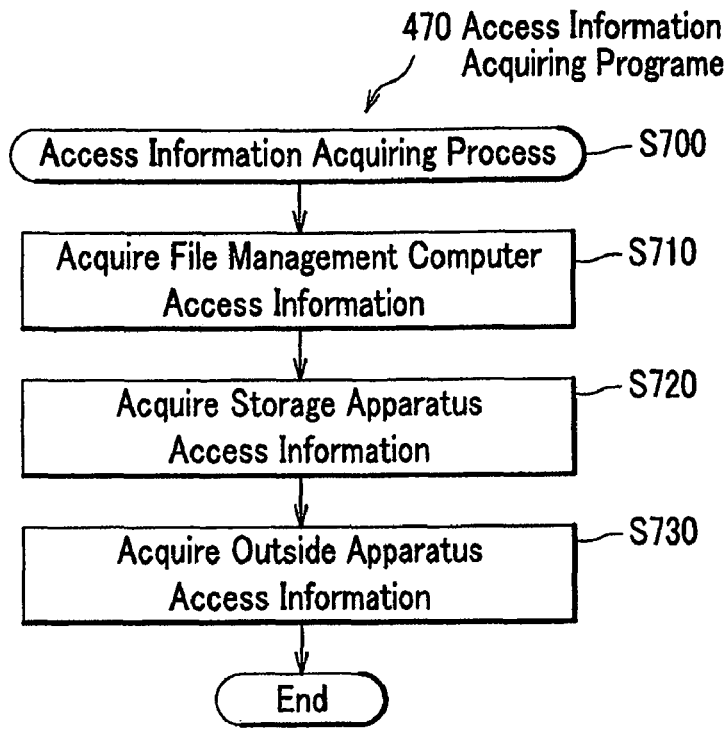
FIG. 7 is a flow chart showing an access information acquiring process.

FIG. 7 is a flowchart showing an access information acquiring process. An access information acquiring process S700 executed by the access information acquiring program 470 is a process for acquiring access information from the file management computer 110, the storage apparatus 180 and an outside apparatus, and storing the access information in the access information table 475.

The capacity management computer 120 executes the access information acquiring process S700, when an administrator gives a start instruction, in a predetermined periodic frequency, or when a specific matter such as insufficiency of available capacity for the file system is noticed from an apparatus coupled to the management network 130.

In a step S710, the capacity management computer 120 transmits an acquiring request of the access history information table 275 to one or a plurality of file management computers 110 coupled to the management network 130. Then, the capacity management computer 120 produces the file system statistical information table 600 by extracting only an item to be referred by the volume optimizing program 480, among the items in the access history information table 275 which is replied by the file management computers 110 responding to the acquiring request.

In a step S720, the capacity management computer 120 transmits an acquiring request of the statistical information table 370 to one or a plurality of storage apparatuses 180 coupled to the management network 130. Then, the capacity management computer 120 produces the storage apparatus statistical information table 650 by extracting only an item to be referred by the volume optimizing program 480, among the items in the statistic information table 370 which is replied by the storage apparatus 180 responding to the acquiring request.

In a step S730, the capacity management computer 120 requests statistical information acquirement to an apparatus having information needed for the capacity optimizing program 480, if there is an apparatus coupled to the management network 130 besides the file management computer 110 and the storage apparatus 180. For example, the capacity management computer 120 can acquire a band activity rate from a monitoring device for monitoring the network band activity.

Steps S710, S720, and S730 are respectively independent processes. It is not always necessary to continuously process these steps, and is possible to simultaneously process the steps in parallel. Further, it is not always necessary to process the steps S710, S720, and S730 at the same timing. For example, it is possible to take a procedure that the step S710 is carried out every 10 minutes, the step S720 is carried out every 20 minutes, and the step 730 is carried out at the timing when the administrator instructs the execution.

(Capacity Optimization Process)

Figure 8:
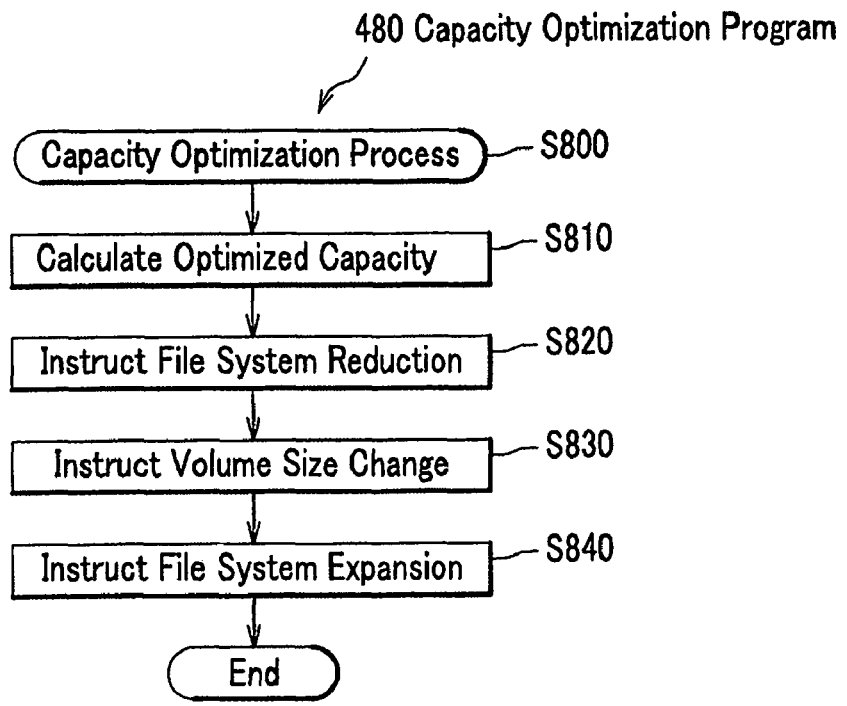
FIG. 8 is a flow chart showing a capacity optimization process in the first embodiment.

FIG. 8 is a flowchart showing a capacity optimization process in the first embodiment. A capacity optimization process S800 is a process carried out by the capacity optimization program 480. The capacity management computer 120 executes the capacity optimization process S800 at the timing when the administrator gives a start instruction, in a predetermined periodical frequency, or when a specific matter such as insufficiency of available capacity of the file system is notified from an apparatus coupled to the management network 130.

First, at a step S810, the capacity management computer 120 calculates optimized capacity of the respective volumes, which is allocated to the respective file management computers and the file systems, based on the access information table 475.

The above-mentioned optimized capacity (proper capacity) represents capacity configuration for the respective volumes optimized so that based on a specific standard expected by the administrator, such as performance, a usage rate of a storage, reliability, and a usage amount of electric power, the standard in the whole storage system is maximally increased. The optimized capacity can be obtained based on the standard, which is indicated by the administrator, and statistical information such as current whole capacity 615, available capacity 616 and capacity consuming speed 617 shown in FIG. 6A.

In a calculating process of the optimized capacity, it is possible to transfer capacity between the volumes having the file system capable of changing the capacity by using the same storage apparatus and storage media, in a range that a total of the volume capacity is not changed and that the transferred capacity is not lower than the usage capacity of the respective file systems. Here, increase in the total of the volume capacity is acceptable, provided that capacity of the storage media can be added by the administrator.

For a specific example of the step S810, a process for calculating the optimized capacity based on the statistical information in FIGS. 6A and 6B (file system statistic information table 600 and storage apparatus statistical information table 650) will be explained. Here, it is assumed that the administrator of the storage system instructs to calculate the optimized capacity so that a usage rate of the storage system is mostly optimized, in other words, so that a longest time is needed to cause insufficiency of the available capacity for the respective volumes. In the example shown in FIG. 6A, the two volumes Vol1 (540a) and Vol2 (540b), on which the two file systems FS1 and FS2 are built, belong to the storage medium group RG1 (550), and the capacity of the two volumes can be transferred.

The capacity management computer 120 calculates a total of the available capacity 616 in the file system group using the same storage medium, and distributes the total available capacity in the same rate as the rate between the capacity consuming speeds 617 of the respective file systems. Then, the capacity management computer 120 changes the whole capacity 615 of the respective file systems to capacity that is calculated by adding the available capacity obtained after the calculation to used capacity of the file system, that is, a difference between the whole capacity 500 and the available capacity 616 obtained before the calculation, in order to keep the available capacity 616 after the distribution.

In FIG. 6A, total available capacity of the file system ID FS1 in the data 620 and the file system ID FS2 in the data 621 is 300 GB. Accordingly, the capacity management computer 120 allocates the total available capacity in the same rate as a rate between the capacity consuming speeds, 200 MB/day: 100 MB/day, and calculates the optimized capacity as 700 GB (sum of the using capacity 500 GB and the available capacity 200 GB) for the total capacity of the file system FS1 (520a) in which the available capacity becomes 200 GB, and as 300 GB (sum of the using capacity 200 GB and the available capacity 100 GB) for the total capacity of the file system FS2 (520b) in which the available capacity becomes 100 GB.

As shown in FIG. 8, in the subsequent step S820, the capacity management computer 120 transmits an instruction request for reducing a file system to the file system management computer 110 having a file system that includes a volume of which optimized volume capacity is smaller than the current volume capacity as calculated in the step S810.

When the file management computer 110 receives the file system reducing instruction request, the file system program 260 starts an operation process to reduce the file system.

Hereinafter, an example of the first reducing process of the file system will be shown. In order to reduce the file system, the file management computer 110 makes a volume area in a back area of the reduced volume capacity unused. In order to make the volume area unused, if file data and management data are already arranged in the back area of the reduced volume capacity, the file data and the management data are transferred so as to store the file data and the management data in a range of the reduced volume capacity. Further, the file management computer 110 reduces file system management information such as "inode", which is a data structure for information of each file, and available capacity so as not to manage the volume area located in the back area of the reduced volume capacity. Hereby, it is possible to make the volume area located in the back area of the reduced volume capacity unused.

In the second reducing process of the file system, if a volume allocated to the file management computer 110 is a virtual volume in the storage apparatus 180 and the file management computer 110 can control a physical block allocation mechanism of the storage apparatus 180, the following reducing process of the file system can be performed according to Japanese Laid-Open Patent Application No. 2003-15915. First, the file management computer 110 calculates the number of the physical blocks of which allocation release is needed, until the instructed volume capacity is obtained. If there is a physical block unused by the file system, the file management computer 110 instructs the storage apparatus to release allocation of the physical blocks up to the required number. If the instructed volume capacity is over the capacity obtained by releasing all the allocation of the physical blocks unused, the file management computer 110 selects a plurality of the physical blocks partially used by the file system, transfers data in the physical blocks with keeping consistency of the file system, and divides the physical blocks into blocks in which all areas are used and blocks in which no area is used. Then, the file management computer 110 instructs the storage apparatus to release the allocation of the physical blocks in which no area is used.

In the second reducing process of the file system, the data is transferred only in the physical blocks partially used by the file system. Therefore, reduction of the file system, in which all areas in the volumes are equally consumed, is achievable for a shorter time than the first reducing process of the file system.

As shown in FIG. 8, in the subsequent step S830, the capacity management computer 120 transmits an instruction of changing volume capacity to the storage apparatus 180 having the respective volumes, of which optimized capacity is calculated in the step S810 different from the current volume capacity.

The capacity management computer 120, in the subsequent step S840, transmits a request for instructing file system expansion to the file management computer 110 having respective file systems, of which optimized volume capacity is calculated in the step S810 larger than the current volume capacity.

When the file management computer 110 receives the request for instructing the file system expansion, the file system program 260 starts operation and an expanding process of the file system is carried out.

Next, an example of the expanding process of the file system will be explained. The file management computer 110 expands file system management information such as "inode" and the available areas, and makes the newly added areas capable of being managed. Hereby, the file management computer 110 becomes capable of using the added areas through the volume expansion, and the expanding process of the file system is completed.

In FIG. 8, the capacity management computer 120 can realize the capacity optimization of the whole storage system, by completing the series of steps from S810 to S840.

Figure 9:
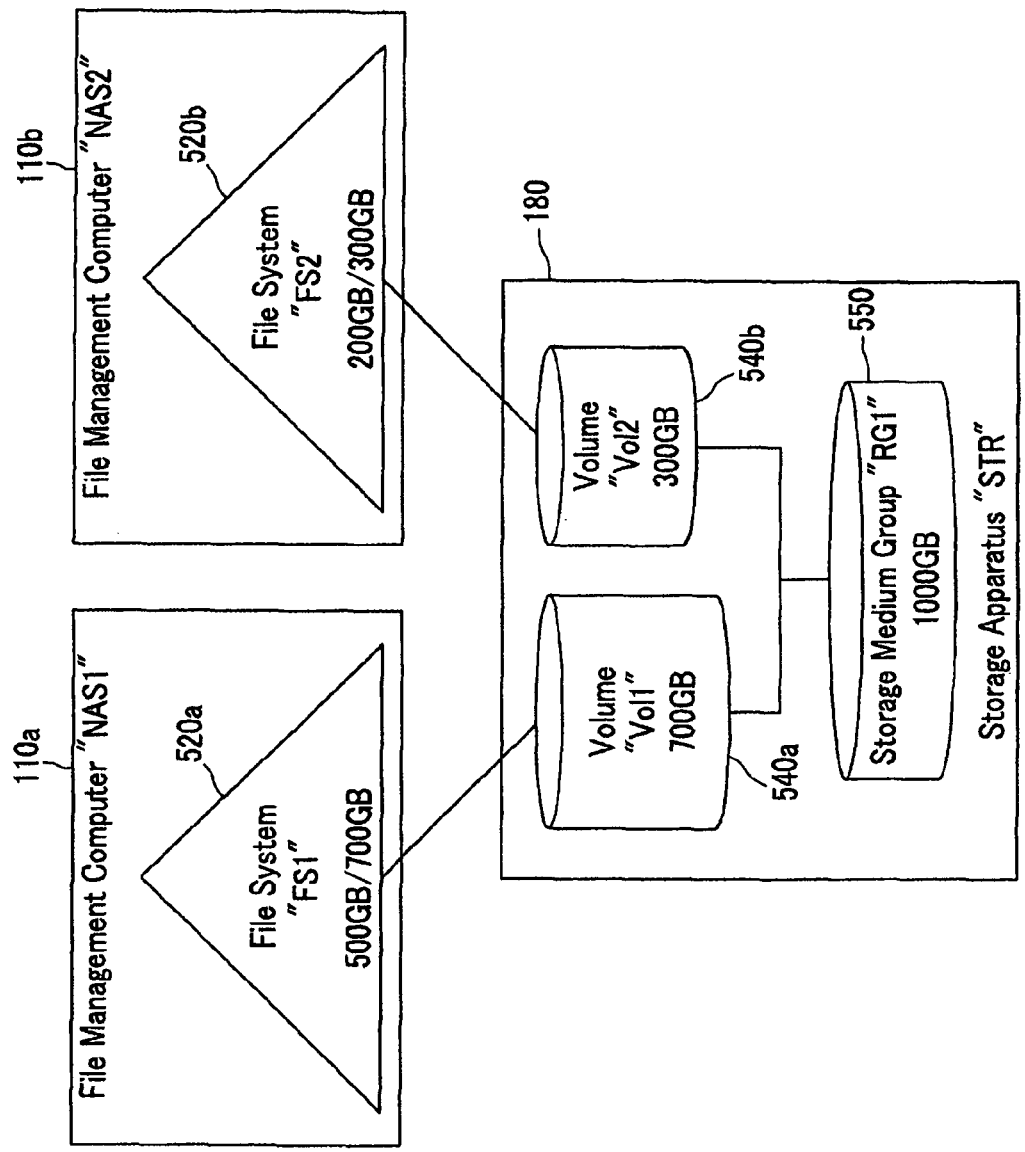
FIG. 9 is a block diagram showing an example of an operation mode of the storage system after the capacity optimization process is executed in the first embodiment.

FIG. 9 is a block diagram showing an example of an operational mode of the storage system after the capacity optimization process in the first embodiment is executed. FIG. 9 shows a state of the operational mode after the capacity optimization process S800 is executed for the storage system 100a shown in FIG. 5. The storage medium group 550 included in the storage apparatus 180 has 1000 GB without changing the capacity of the storage media group 550 before/ after the capacity optimization process S800. However, although the volumes 540a and 540b produced by the storage medium group 550 originally have 500 GB respectively before the capacity optimization process S800, after the capacity optimization process S800, the volume 540a comes to have 700 GB and the volume 540b comes to have 600 GB. Further, in association with a change in the volume capacity, maximum capacity of the file systems 520a and 520b is changed. As a result, without adding the storage medium group 550, the available capacity is added to the file system 520a being short of the capacity, and the file system 520a becomes capable of being operated successively. Further, according to the file system statistic information table 600, after the optimization process S800 is executed, if both file systems use the capacity at the current capacity consuming speeds 617, both file systems 520a and 520b will be short of the capacity at the same time after 1000 days. At that time, the whole capacity of the storage medium group is completely consumed. Thus, it is shown that a period until shortage of the available capacity occurs is actually most elongated.

Second Embodiment

Hereinafter, a second embodiment of the present invention will be explained.

According to the second embodiment, when files are transferred among the file systems, the storage system can use a mechanism that a change in a file name is concealed from outside computers, and an input/output operation to the file is possible by using the same file name before/after the files are transferred. Regarding methods for concealing the name change, Japanese Laid-Open Patent Application No. 2006-216070, and Japanese Laid-Open Patent Application No. 2006-164211 disclose the methods. In the second embodiment, the respective methods will be explained by presenting a first example of the concealing mechanism of the name change (see FIGS. 14 and 15), and a second example of the concealing mechanism of the name change (see FIG. 16).

(Example of First Concealing Mechanism of Name Change)

Figure 14:
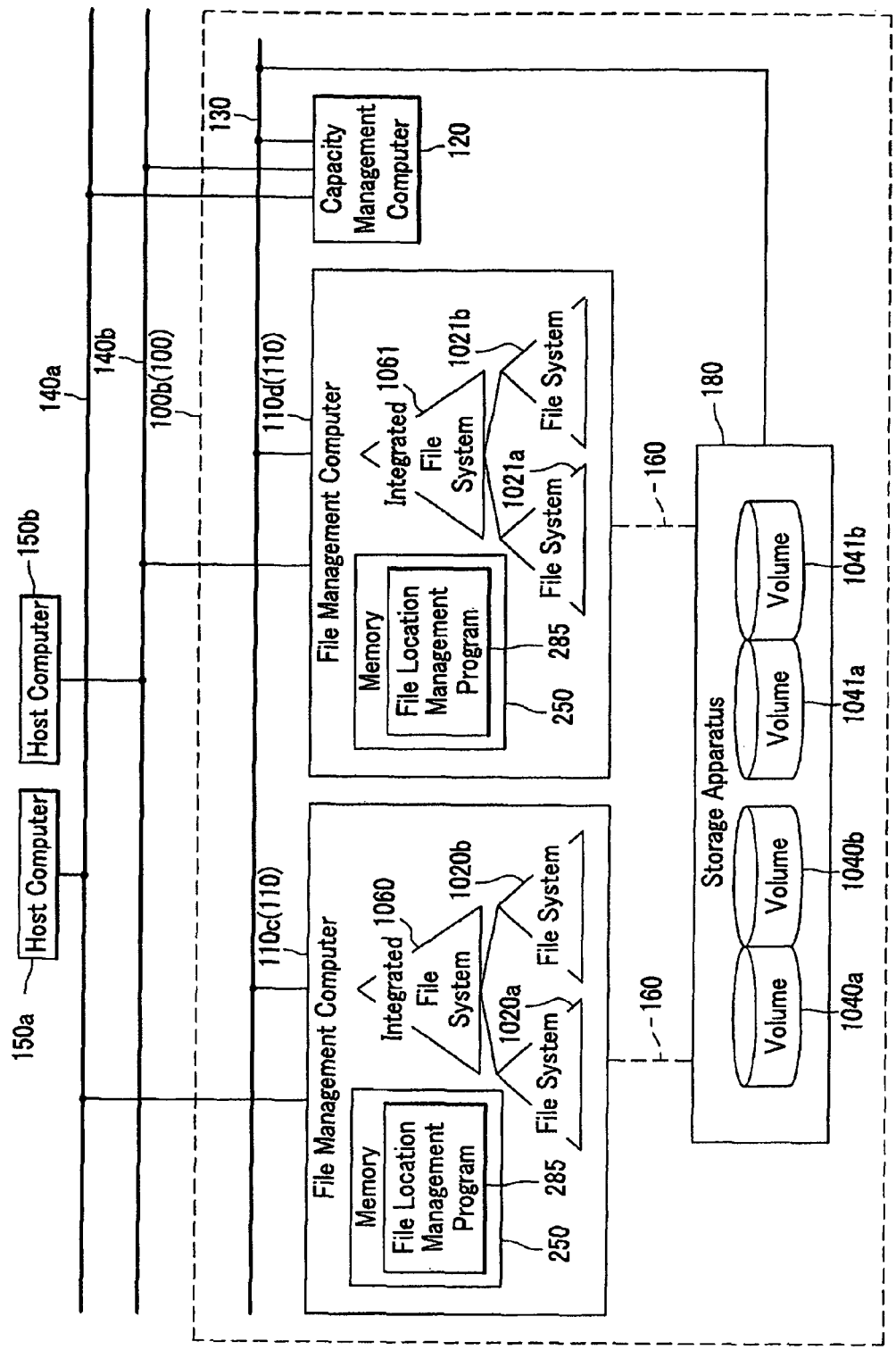
FIG. 14 is a block diagram showing an example of configuration of the computer system including the storage system in the second embodiment.

FIG. 14 is a block diagram showing a configuration example of a computer system including the storage system in the second embodiment. FIG. 14 shows the computer system including the storage system 100b (100) to which a technology described in Japanese Laid-Open patent Application No. 2006-216070 is applied. The memories 250 of the file management computers 110c (110) and 110d (110) included in the storage system have a file location management program 285. The file location management program 285 has a file name management table 1600 shown in FIG. 15.

Figure 15:
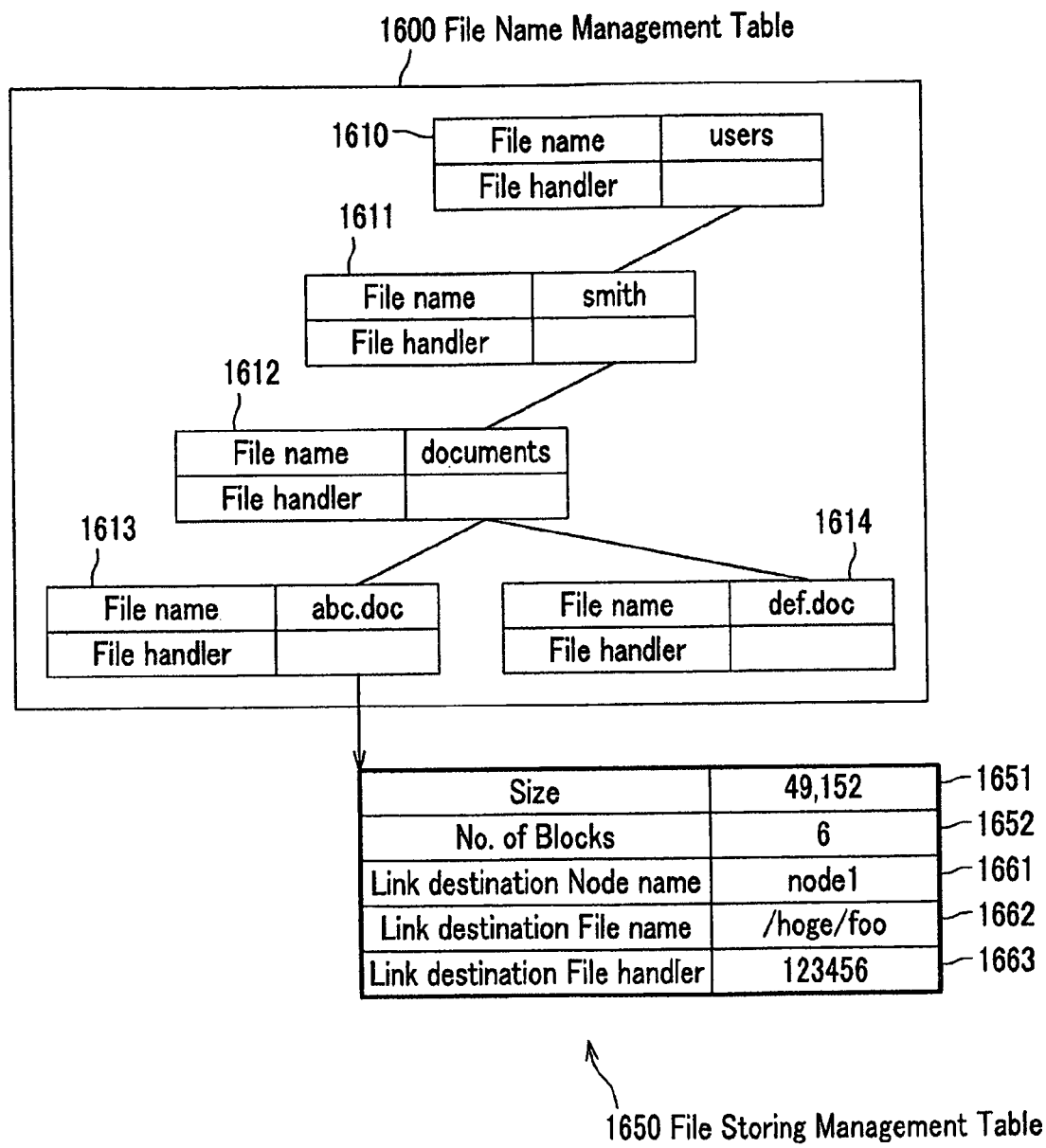
FIG. 15 is an explanatory diagram showing an example of a group of tables stored in a file location management program in the second embodiment.

FIG. 15 is an explanatory diagram showing an example of a group of tables stored in the file location management program of the second embodiment. The file name management table 1600 stores various types of meta information 1610, 1611, 1612, 1613, and 1614 such as a file name and a file handler in association with respective files, which are managed by the file management computer 110. Further, the meta information of the file has a reference to a file storing management table 1650.

The file storing management table 1650 includes information on a file storage such as a size 1651 and the number of blocks 1652. Further, the file storing management table 1650 includes a link destination node name 1661, a link destination file name 1662, and a link destination file handler 1663.

When the file management computer 110 receives an input/output request for a file, the file management computer 110 referrers to the file storing management table 1650 and transmits the input/output request to the file located at a place, which is described in the link destination node name 1661, the link destination file mane, and the link destination file handler 1663. When a file is transferred among the file systems, by changing the link destination file information in the file storing management table, the file transfer becomes possible without changing the original file name. Hereby, the file transfer can be concealed from other computers outside for the file management computers 110.

(Example of Second Concealing Mechanism of Name Change)

Figure 16:
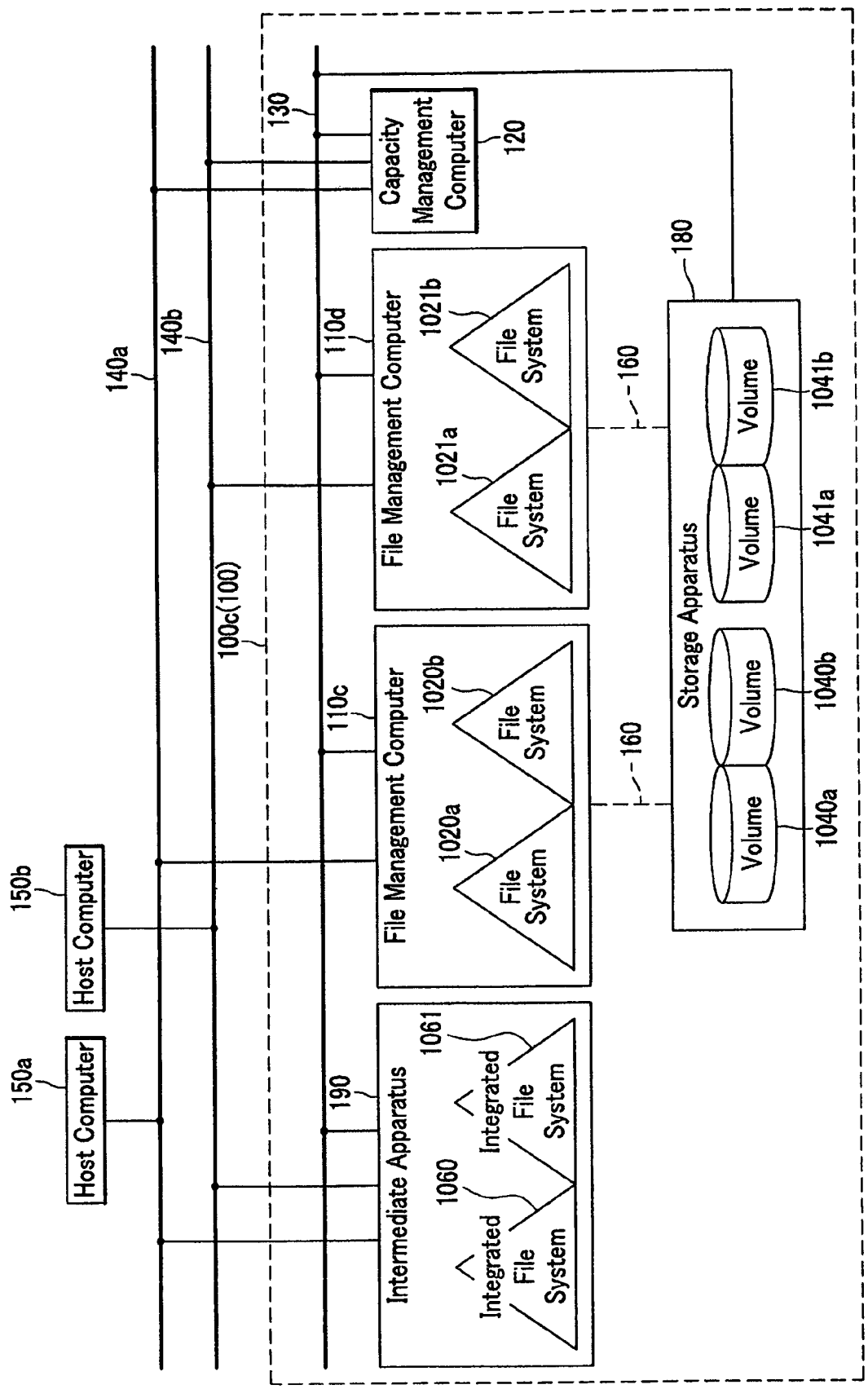
FIG. 16 is a block diagram showing an example of configuration of the computer system including another storage system in the second embodiment.

FIG. 16 is a block diagram showing a configuration example of a computer system including the other storage systems in the second embodiment. FIG. 16 shows the computer system including the storage system 100c provided by applying the technology of Japanese Laid-Open Patent Application No. 2006-164211 to the storage system 110a. The storage system 100c has configuration to which an intermediate apparatus 190 (reception apparatus) is added.

According to a method described in Japanese Laid-Open Patent Application No. 2006-164211, when the host computers 150a and 150b in FIG. 1 perform an input/output operation of a file stored in the file management computers 110c (110) and 110d (110), the host computers 150a and 150b request of the intermediate apparatus 190 the input/output operation, without directly communicating to the file management computers 110c and 110d.

The intermediate apparatus 190 refers to a file in the file management computers 110ca and 110d, and when stub information, which includes a link to another file system, is stored in the file itself, again transmits the input/output request to the file management computers 110c and 110d storing the link destination file. When the file is transferred between the file management computers 110c and 110d or in the file management computers 110c and 110d, the intermediate apparatus 190 produces the stub information, and keeps the link to the transferred destination file as the original file name. Hereby, the intermediate apparatus 190 can conceal the file transfer between the file management computers 110c and 110d or inside the file management computers 110c and 110d.

By using the first concealing mechanism of the name change or the second concealing mechanism of the name change, the storage system 100 can show the file systems provided by the respective file management computers 110c and 110d, to the host computers 150a and 150b as integrated file systems 1060 and 1061, since the host computers 150a and 150b do not need to know in which file system the processing requested file is stored, when the file management computers 110c and 110d include a plurality of file systems 1020a and 1020b, and a plurality of file systems 1021a and 1021b, respectively.

By using the concealing mechanism of the name change, the storage system 100 becomes capable of changing a storage location of the file without changing the file name, which is needed by the host computers 150a and 150b to refer to the file. As mentioned above, the process to transfer the file among the file systems with keeping the file name is called migration.

Figure 10:
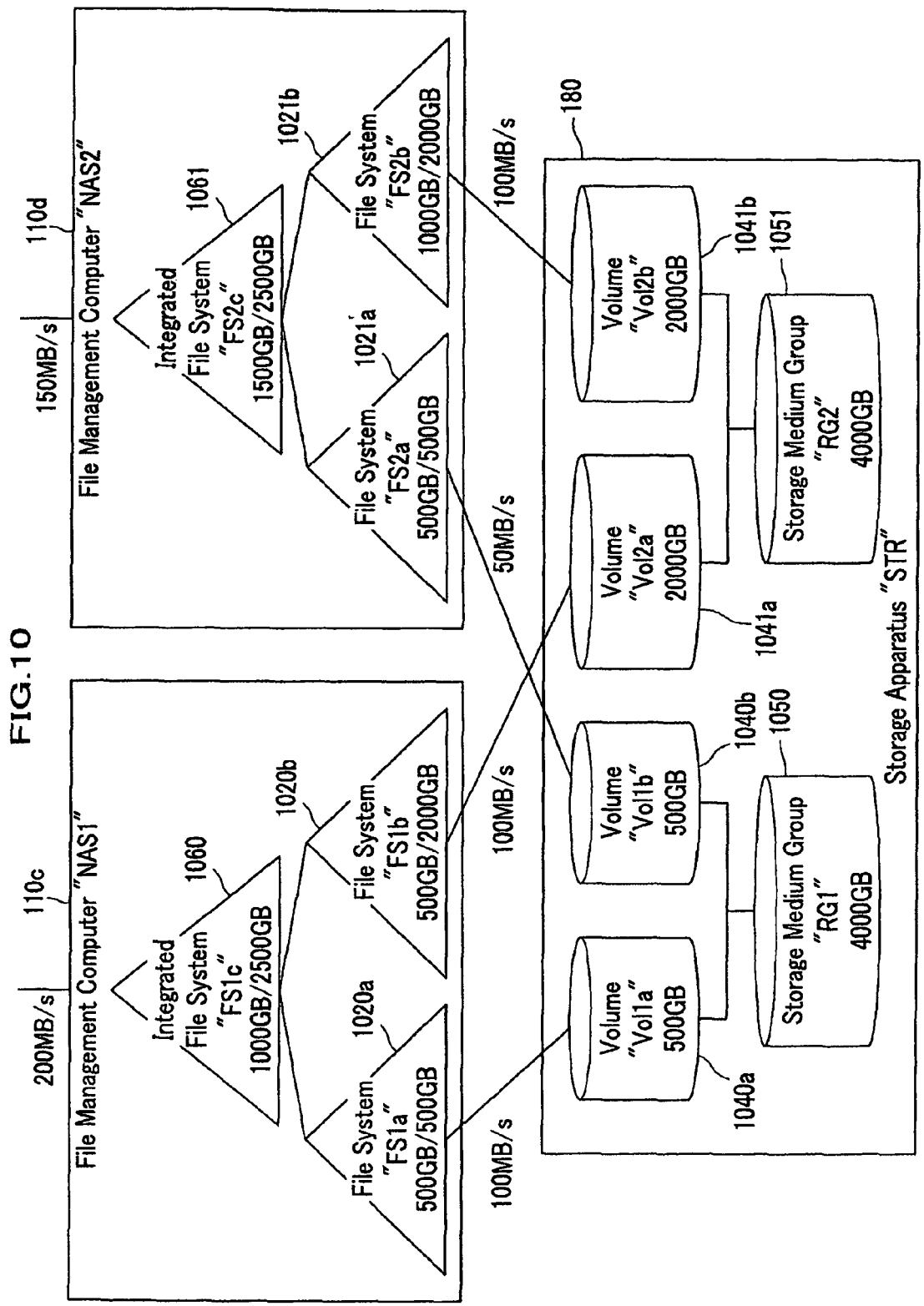
FIG. 10 is a block diagram showing an example of an operation mode of the storage system in the second embodiment.

FIG. 10 is a block diagram showing an example of an operation mode of the storage system in the second embodiment. The operational mode shown in FIG. 10 has a configuration almost similar to the storage system 100a shown in FIG. 5. However, a difference is that the storage apparatus 180 having the storage ID "STR" has a plurality of storage medium groups 1050 and 1051.

In the storage system 100 (100b or 100c), the file management computer having an ID "NAS1" and the file management computer 110d having an ID "NAS2" share a single storage apparatus 180 having an ID "STR".

The storage apparatus "STR" (180) has the storage medium group 1050 having an ID "RG1", in which two volumes 1040a and 1040b having names of "Vol1a" and "Vol1b" are prepared. In this example, the storage medium group 1050 has 1000 GB capacity, and the volumes 1040a and 1040b have halves of the capacity, 500 GB respectively. Further, the storage apparatus "STR" (180) has the storage medium group 1051 having an ID "RG2", in which two volumes 1041a and 1041b having names of "Vol2a" and "Vol2b" are prepared. In this example, the storage medium group 1051 has 4000 GB capacity, and the volumes 1041a and 1041b have halves of the capacity, 2000 GB respectively.

Here, it is assumed that the storage medium 1050 and the storage medium 1051 have different properties besides the capacity. For example, the storage medium groups can be assumed, which has differences in an input/output band, a delay time, reliability of a device, and a price. Hereinafter, by assuming that a high speed storage medium such as the SSD is used in the storage medium group 1050 and that a storage medium such as the HDD with a lower performance than the SSD is used in the storage medium group 1051, an example that the storage medium group 1050 has a higher performance in the input/output band than the storage medium 1051 will be explained.

The file system management computer 110c prepares the file system 1020a with an ID "FS1a" on the volume 1040a, and the file system 1020b with an ID "FS1b" on the volume 1041a. The file system management computer 110d produces the file system 1021a with an ID "FS2a" on the volume 1040b, and the file system 1021b with an ID "FS2b" on the volume 1041b. The file system 1020a and the file system 1021a already use all the capacity against the total capacity 500 GB. The file system 1020b uses 500 GB against the total capacity 2000 GB, and available capacity 1500 GB is remained. The file system 1021b uses 1000 GB against the total capacity 2000 GB, and available capacity 1000 GB is remained.

Herein, the file management computers 110c and 110d prepare the integrated file system integrating the respective file system capacity by using the name concealing mechanism. The file system management computer 110c integrates the file systems 1020a and 1020b and prepares the integrated file system "FS1c" (1060). The integrated file system 1060 has the total capacity 2000 GB adding the capacities of the file systems 1020a and 1020b, and the used capacity 1000 GB.

Similarly, the file system management computer 110d integrates the file systems 1021a and 1021b and produces the integrated file system "FS2c" (1061). The integrated file system 1061 has the total capacity 2500 GB adding the capacity of the file systems 1021a and 1021b, and the used capacity 1500 GB.

FIGS. 11A and 11B are explanatory diagrams showing an example of the access information tables. The access information table 475 includes a file system statistical information table 600A shown in FIG. 11A, and a storage apparatus statistical information table 650A shown in FIG. 11B.

The file system statistical information table 600A stores pieces of one line data 1120a, 1120b, 1121a, and 1121b for the respective volumes constituting the integrated file system. The file system statistical information table 600A has similar information to the file system statistical information table 600 (see FIG. 6A), and comprises, in addition to a file system ID 612, a node ID 611 which specifies the file system computer having the file system, a volume ID 613 showing a volume preparing the file system, a capacity changeable index 614 (flag) showing whether a change in the capacity is possible or not, a total capacity volume 615 of the file system, and available capacity 616 showing unused areas in the file system.

Further, the file system statistical information table 600A stores a current performance 1117 (access speed) and a requested performance 1118 (required access speed). The current performance 1117 is calculated based on a previous input/output speed by referring to the access history information table 275 included by the file management computer 110. The requested performance 1118 is calculated by dividing the current performance by a rate between the number of the total files requests from the host computers 150a and 150b and the number of the file request to which the file management computer 110 can not respond because of I/O waiting against the storage apparatus 180. Alternatively, the requested performance 1118 can be directly written in the file system statistical information table 600A by a storage administrator through the I/O interface 420 and the network interface 410.

Since above mentioned information on the file system statistical information table 600A is shown as an example, other information such as detailed information on an access frequency of a file, and a capacity consumption per dates can be stored in the table 600A.

The storage apparatus statistical information table 650A is a kind of the access information table 475 produced by the access information acquiring program 470 in the capacity management computer 120, by collecting the statistical information table 370 of the storage apparatus 180. The storage apparatus statistical information table 650A stores pieces of one line data 1170a, 1170b, 1171a, and 1171b per volume in the storage system. The storage apparatus statistical information table 650A stores a storage apparatus ID 661, a storage medium ID 662, a maximum performance of the storage medium 663, a volume ID 664, volume capacity 665, and a volume destination node ID 666. Further, other statistical information can be included similar to the storage apparatus statistical information table 650.

For example, it is assumed that an I/O request for the integrated file system is distributed to the respective file systems corresponding to a usage rate of volumes in the file systems constituting the integrated file system. In this example, the I/O input requests against the integrated file system "FS1c" (1060) are distributed to the volume "Vol1a" (1040a) and the volume "Vol2a" (1041a) in the rate of 1:1. Further, the I/O input requests against the integrated file system "FS2c" (1061) are distributed to the volume ID "Vol1b" (1040b) and the volume ID "Vol2b" (1041b) in the rate of 1:2, based on the usage rate of the capacity.

Total maximum performance of the storage medium group "RG1" (1050) and the storage medium group "RG2" (1051) is represented as 600 MB/s based on the maximum performance 663 in the file system statistical information table 600A. Total requested performance of the integrated file systems 1060 and 1061 is represented as 450 MB/s based on the requested performance 1118 in the file system statistical information table 600A. Therefore, the performance of the storage medium groups 1050 and 1051 is sufficiently superior to the requested performance. However, if the distribution rate of the I/O requests is considered, the requested performance 1118 can not be satisfied according to the file system statistical information table 600A. For example, according to the file system statistical information table 600A, the current performance 1117 showing 200 MB/s is inferior to the requested performance 300 MB/s in the integrated file system "FS1c" (1060).

Figure 12:
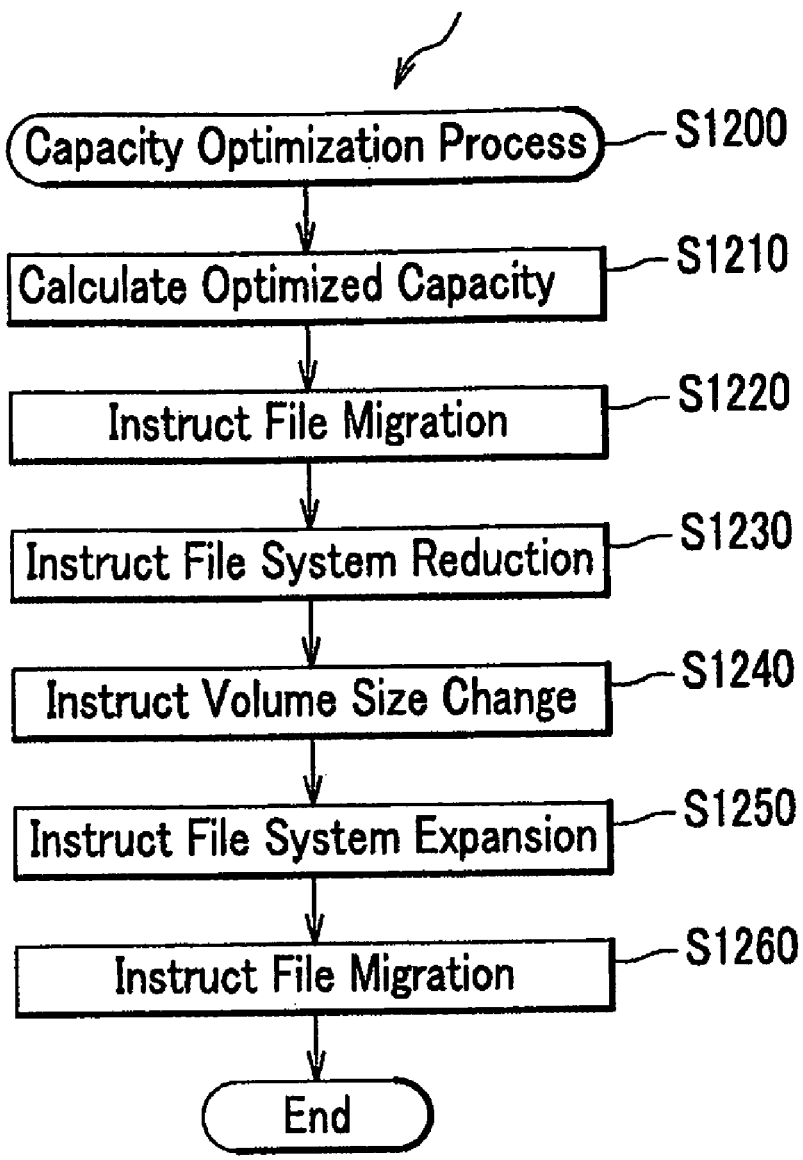
FIG. 12 is a flow chart showing a capacity optimization process in the second embodiment.

FIG. 12 is a flowchart showing a capacity optimization process in the second embodiment. A capacity optimization process S1200 is a process executed by a capacity optimization program 480. The capacity management computer 120 executes the capacity optimization process S1200, when a specific matter is noticed through an apparatus coupled to the management network 130, for example, when a start instruction is given by an administrator, in a predetermined periodical frequency, or when an available capacity becomes insufficient.

First, in a step S1210, the capacity management computer 120 calculates optimized capacity of the respective volumes distributed to the respective file management computers and file systems based on the access information table 475. Herein, the above-mentioned optimized capacity represents capacity configuration for each volume optimized so that based on a specific standard expected by the administrator such as performance, a rate of storages in use, reliability, an amount of an electric power usage, the standard in the whole storage system is maximally enhanced. The optimized capacity is calculated based on the standard instructed by the administrator, and statistical information such as a current total capacity 615, available capacity 616, and a capacity consuming speed 617.

In the optimized capacity calculating step S1210 of the second embodiment, the optimized capacity is calculated assuming that it is possible to reduce the file systems even if an available capacity of the respective file systems is insufficient, which is different from the optimized capacity calculating step S810 (see FIG. 8) in the first embodiment. Herein, the optimized capacity is calculated in a range that an available capacity of the integrated file system integrating the respective file systems does not become insufficient. Further, the optimized capacity is calculated assuming that it is possible to transfer the capacity among the respective file systems in the integrated file system.

As a specific example of the step S1210, an example of the optimized capacity calculation will be explained, which is executed based on the statistical information in FIGS. 11A and 11B (file system statistical information table 600A and storage apparatus statistical information table 650A). Here, it is assumed that the administrator of the storage system 100 instructs to calculate optimized capacity satisfying the requested performance 1118 for the respective integrated file systems "FS1c" and "FS2c".

Based on the conditions as described below, formulae for capacity and performance of the respective file systems can be produced.

A first condition is that a total using amount of the file system in the respective integrated file systems is not changed.

A second condition is that a capacity of the respective file systems is not under the use amount of the capacity.

A third condition is that a total capacity of the file systems, which is comprised of volumes sharing storage medium groups is not over the capacity of the storage medium groups.

A forth condition is that a total requested performance for the file systems, which is comprised of volumes sharing storage medium groups is not over the performance of the storage medium groups.

A fifth condition is that requested performance for the integrated file system is proportional to a rate of the use amounts of the respective file systems, and equal to the requested performance for the respective file systems.

It is assumed that each requested capacity is represented as $T1a$, $T2a$, $T1b$, and $T2b$, and each required use amount is represented as $U1a$, $U2a$, $U1b$, and $U2b$, in the volumes 1040$a$, 1041$a$, 1040$b$ and 1041$b$ storing the file systems 1020$a$, 1020$b$, 1021$a$, and 1021$b$ respectively.

By the first condition, the following formulae are produced.

$U1a+U2a=1000$ GB, $U1b+U2b=1500$ GB

By the second condition, the following formulae are produced.

$T1a>U1a$, $T2a>U2a$, $T1b>U1b$, $T2b>U2b$

By the third condition, the following formulae are produced.

$T1a+T1b<1000$ GB $T2a+T2b<4000$ GB

By the forth and fifth conditions, the following formulae are produced.

$300 \times U1a/(U1a+U2a)+150 \times U1b/(U1b+U2b)<400$, $300 \times U2a/(U1a+U2a)+150 \times U2b/(U1b+U2b)<200$ It is allowable that the total capacity of the integrated file systems is changed or not changed before/after the calculation. In this example, the requested performance can be achieved only by changing the capacity of the volumes 1040$a$ and 1040$b$. That is, in this case, the total capacity of the integrated file systems 1060 and 1061 is changed. If the administrator does not want to change the capacity of the integrated file systems, it is possible not to change the total capacity of the integrated file systems, by reducing 300 GB of the volume 1041$a$ and expanding 300 GB of the volume 1041$b$, in association with 300 GB expansion of the volume 1040$a$ and 300 GB reduction of the volume 1040$b$.

The optimized capacity is calculated by calculating the capacity and the use amount which satisfy the conditions, by a method such as a linear programming under the above-mentioned restrictive conditions. In this example, the following capacity and use amount satisfy the above-mentioned conditions.

$T1a=U1a=800$ GB, $T2a=1700$ GB, $U2a=200$ GB, $T1b=U1b=200$ GB, $T2b=2300$ GB, $U2b=1300$ GB

As shown FIG. 12, in a succeeding step S1220, the capacity management computer 120, transmits a file migration request instruction, for the respective file systems whose use amounts are reduced, having the available capacity in the migration destination, to the file management computer 110 having the corresponded file systems based on the optimized capacity calculated in the step S1210.

The file management computer 110 executes a file migration in the file system for which the file management computer 110 receives a migration instruction, to another file system which has available capacity and belongs to the same integrated file system. By using the technology described in Japanese Laid-Open Patent Application Nos. 2006-216070 and 2006-164211, the file management computer 110 executes the file migration without changing a path of the file recognized by the host computers 150a and 150b, so that the host computers 150a and 150b do not recognize the file migration.

That is, in the above-mentioned example of the optimized capacity calculation, the capacity management computer 120 instructs to execute the file migration for 300 GB in the file system "FS2A" (1021a) to the file system "FS2b" (1021b), since the file system "FS2b" (1021b) already has available capacity 1000 GB.

The capacity management computer 120 or the file management computer 110 determines which file in the file system file should migrate. Herein, for example, it is possible to use a determination standard that a file receiving frequent I/O requests should be stored in the file system using a high speed storage medium group.

In the succeeding step S1230, the capacity management computer 120 transmits a file system reducing instruction request for the respective file systems having volumes of which optimized volume capacity is calculated to be smaller than the current using capacity in the step S1210, to the file management computer 110 having the corresponded file systems. A process in the step S1230 is the same as the process in the step S820 of the first embodiment.

In the succeeding step S1240, the capacity management computer 120 transmits a volume capacity changing instruction, for the respective volumes of which optimized volume capacity is calculated different from the current volume capacity in the step S1210, to the storage apparatus 180 having the corresponded volumes. A process in the step S1230 is the same as the process in the step S830 of the first embodiment.

In the succeeding step S1250, the capacity management computer 120 transmits a file system expanding instruction request, for the respective file systems having volumes of which optimized volume capacity is calculated larger than the current volume capacity in the step S1210, to the file management computer 110 having the corresponded file systems. A process in the step S1250 is the same as the process in the step S840 of the first embodiment.

In the succeeding step S1260, the capacity management computer 120 transmits a file migration instruction request, for the respective file systems whose using capacity is reduced and for which no migration process is executed in the step S1220 based on the optimized capacity calculated in the step S1210, to the file management computer 110 having the corresponded file systems. The file management computer 110 executes the same process as instructed in the step S1220, when the file management computer 110 receives the migration instruction.

The capacity management computer 120 realizes the capacity optimization to improve the whole performance of the storage system, by completing a series of processes from step S1210 to the step S1260.

Figure 13:
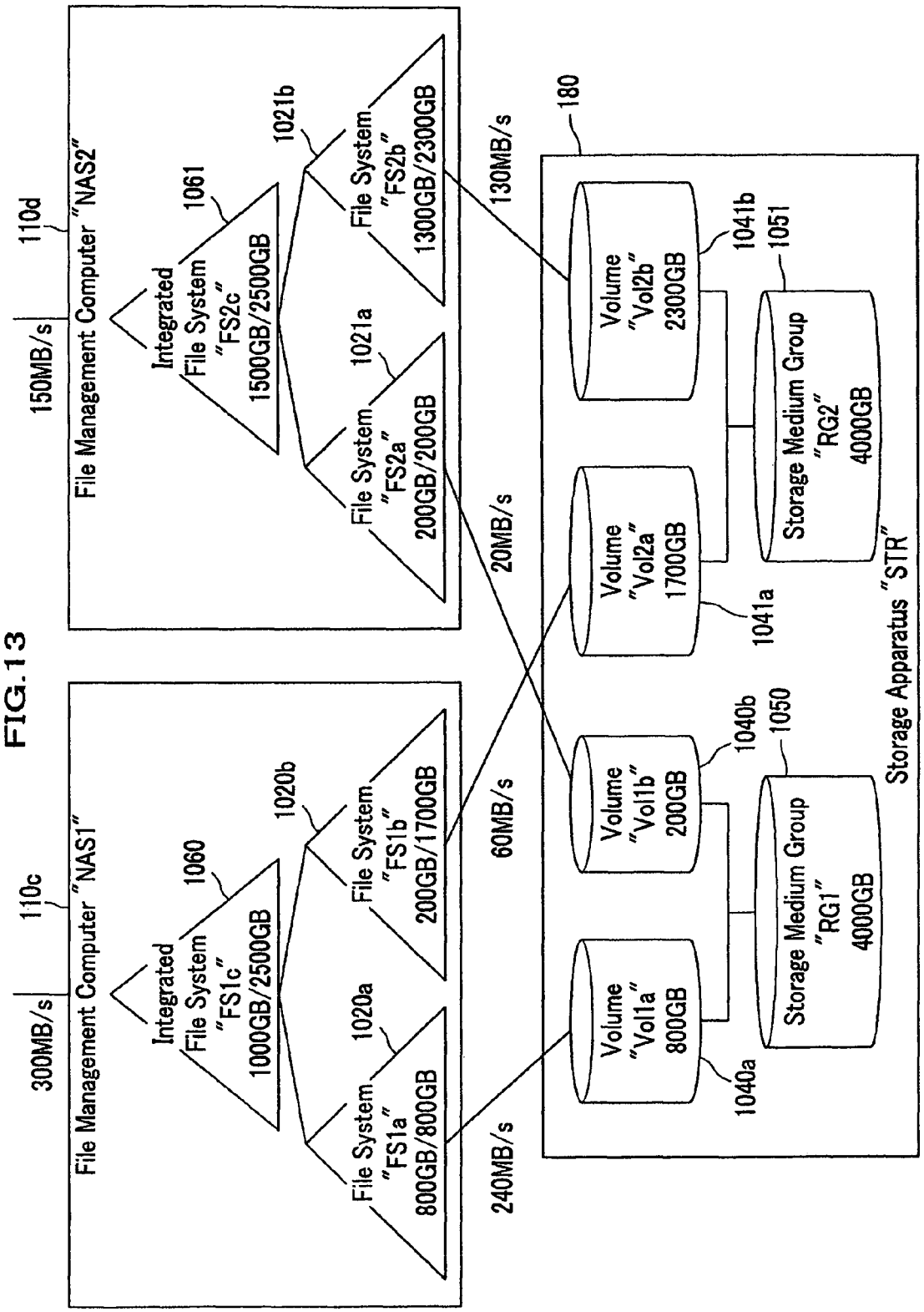
FIG. 13 is a block diagram showing an example of an operation mode of the storage system after the capacity optimization process is executed in the second embodiment.

FIG. 13 is a block diagram showing an example of an operational mode in the storage system after the capacity optimizing process in the second embodiment is executed. FIG. 13 shows a sate 1300 of the storage system 100 after the capacity optimizing step S1200 is executed to improve the performance of the storage system 100 shown in FIG. 10. As the capacity management computer 120 calculates in the step S1210, total capacity of the file system 1020a constituted on the volume 1010a becomes 800 GB, in which the use capacity is 800 GB, and total capacity of the file system 1021a constituted on the volume 1040b becomes 200 GB, in which the use capacity is 200 GB. Further, total capacity of the file system 1020b constituted on the volume 1041a becomes 1700 GB, in which the use capacity is 200 GB, and total capacity of the file system 1021b constituted on the volume 1041b becomes 2300 GB, in which the use capacity is 1300 GB. Herein, as mentioned above, the optimization of the capacity is realized.

Here, if the volumes 1040a, 1040b, 1041a and 1041b perform input/output by 240 MB/s, 20 MB/s, 60 MB/s, and 130 MB/s respectively, each performance of the volumes is not over the maximum performance of the storage medium groups 1050 and 1051, and can satisfy both requested performance of the integrated file systems 1060 and 1061. As a result, a continuous operation satisfying the requested performance can be realized without adding the high speed storage medium group 1050.

The storage system 100 of the present embodiment comprises a plurality of the file management computers 100 constituting the file systems on the volumes of the storage apparatus 180, and the capacity management computer 120 managing and redistributing the capacity allocated to the respective file systems.

The capacity management computer 120 stores the file system statistical information table 600 relating to the allocated capacity of the respective file systems, and the storage apparatus statistical information table 650 relating to the volume capacity of the storage apparatus 180, by collecting the tables from the file management computer 110 and the storage apparatus 180. When the capacity management computer 120 accepts a redistribution request of the allocated capacity of the file systems, calculates the allocated capacity for the respective file systems so that the total available capacity of the file systems satisfies the predetermined performance information, based on the file system statistical information table 600 and the storage apparatus statistical information table 651. Then, the capacity management computer 120 transmits a file system reducing instruction to the file system management computer managing the file systems whose allocated capacity becomes reduced, among the plurality of the file management computers. Further, the capacity management computer 120 transmits a volume capacity changing instruction to the storage apparatus based on the allocated capacity, and transmits a file system expanding instruction to the file system management computer managing the file systems whose allocated capacity becomes expanded, among the plurality of the file system management computers.

Here, according to the first embodiment, the file management computer managing the file systems, whose allocated capacity becomes reduced among the plurality of the file management computers, is corresponded to the file management computer 110b. The file system management computer managing the file systems, whose allocated capacity becomes expanded among the plurality of the file system management computers, is corresponded to the file management computer 110a. Further, according to the second embodiment, as shown in FIGS. 10 and 13, there is a case that the capacity of the file systems managed by the integrated file systems 1060 and 1061 (file systems 1020a and 1020b or file systems 1021a and 1021b) becomes reduced or expanded. Hereby, the file management computers 110c and 110d are corresponded to both of the file management computers managing the file systems whose allocated capacity becomes reduced among the plurality of the file management computers, and whose allocated capacity becomes expanded among the plurality of the file management computers.

What is claimed is:

1. A storage system, comprising:
   a storage apparatus;
   a plurality of file management computers building file systems on volumes in the storage apparatus; and
   a management computer managing and redistributing allocated capacity of the volume allocated to the respective file systems,
   wherein the management computer stores file system statistical information and storage apparatus statistical information, both of which are collected from the file management computers and the storage apparatus,
   wherein the file system statistical information relates to the allocated capacity for each of the file systems,
   wherein the storage apparatus statistical information relates to volume capacity of the storage apparatus,
   wherein the management computer calculates the allocated capacity to the respective file systems so that total available capacity for the file systems satisfies predetermined performance information, based on the file system statistical information and the storage apparatus statistical information, when the management computer accepts a redistributing request for the allocated capacity for the file system,
   wherein the management computer transmits a file system reducing instruction to the file management computer which is among the plurality of the file management computers and manages the file system whose allocated capacity is to be reduced,
   wherein the management computer transmits a volume capacity changing instruction to the storage apparatus based on the allocated capacity,
   wherein the management computer transmits a file system expanding instruction to the file management computer which is among the plurality of the file management computers and manages the file system whose allocated capacity is to be expanded,
   wherein the file system statistical information comprises identification data (ID) of the file system; identification data (ID) of the volume; the allocated capacity of the volume; the available capacity of the volume; and a capacity consuming speed which is the speed consuming the capacity, and
   wherein the storage apparatus statistical information comprises the identification data (ID) of the volume, the allocated capacity for the respective identification data (IDs) of the volumes, and
   wherein the predetermined performance information is the capacity consuming speed.

2. A storage system according to claim 1,
   wherein the file system statistical information comprises identification data (ID) of the file system; identification data (ID) of the volume; the allocated capacity of the volume; the available capacity of the volume; an access speed which is determined by a previous input/output speed; and a requested access speed,
   wherein the storage device statistical information comprises the identification data (ID) of the volume, the allocated capacity for the respective identification data (IDs) of the volumes, and
      wherein the predetermined performance information is the requested access speed.

3. A storage system according to claim 1,
   wherein an integrated file system integrating a plurality of the file systems is built, and file location management information which associates the integrated file system with the file systems is stored in the management computer for files to be stored, in the file management computers,
   wherein if the file system management computer accepts an input/output request for a file in the integrated file system, the file system management computer specifies the file referring to the file location management information and accesses the file, and
   wherein if a file migrates between the file systems, the file management computer updates the file location management information.

4. A storage system according to claim 1, further comprising a reception apparatus for receiving an input/output request for a file,
   wherein if the reception apparatus accepts the input/output request for the file, the reception apparatus refers to files in the file management computers, and if stub information which represents a link to another file system is stored in the file, the reception apparatus again transmits the input/output request to the file management computer storing the file at a destination of the link, and
   wherein if the file migrates among the file management computers or in the respective file management computers, the reception apparatus prepares the stub information to keep the link to the file at a migrating destination by an original file name.

5. A capacity managing method for managing and redistributing allocated capacity allocated to respective file systems, in a storage system in which a storage apparatus and a plurality of file management computers building the file systems on volumes in the storage apparatus are capable of communicating to a management computer through a network comprising:
   by the management computer, storing file system statistical information relating to the allocated capacity for each of the file systems, and storage apparatus statistical information relating to volume capacity of the storage apparatus, both of which are collected from the file management computers and the storage apparatus;
   by the storage apparatus, calculating the allocated capacity to the respective file systems so that total available capacity for the file systems satisfies predetermined performance information, based on the file system statistical information and the storage apparatus statistical information, if the management computer accepts a redistributing request for the allocated capacity for the file systems;
   by the storage apparatus, transmitting a file system reducing instruction to the file management computer which is among the plurality of the file management computers and manages the file system whose allocated capacity is to be reduced;
   by the storage apparatus, transmitting a volume capacity changing instruction to the storage apparatus based on the allocated capacity;
   by the management computer, transmitting a file system expanding instruction to the file management computer which is among the plurality of the file management computers and manages the file system whose allocated capacity is to be expanded;
   wherein the file system statistical information comprises identification data (ID) of the file system; identification data (ID) of the volume; the allocated capacity of the volume; the available capacity of the volume; and a capacity consuming speed which is the speed consuming the capacity, wherein the storage apparatus statistical information comprises the identification data (ID) of the volume, the allocated capacity for the respective identification data (IDs) of the volumes, and wherein the predetermined performance information is the capacity consuming speed.

6. A capacity management method according to claim 5, wherein the file system statistical information comprises identification data (ID) of the file system; identification data (ID) of the volume; the allocated capacity of the volume; the available capacity of the volume; an access speed which is determined by a previous input/output speed; and a requested access speed, and wherein the storage apparatus statistical information comprises the identification data (ID) of the volume; the allocated capacity for the respective identification data (IDs) of the volumes, and wherein the predetermined performance information is the requested access speed.

7. A capacity management method according to claim 5, wherein an integrated file system integrating a plurality of file systems is built, and file location management information which associates the integrated file system with the file systems is stored in the storing unit for files to be stored, in the file management computer, and wherein if the file management computer accepts an input/output request for a file in the integrated file system, the file management computer specifies the file of the input/output request by referring to the file location management information and accesses the file, and wherein if a file migrates between the file systems, the file management computer updates the file location management information.

8. A capacity management method according to claim 5, wherein the storage system further comprises a reception apparatus for receiving an input/output request for a file, and wherein if the reception apparatus accepts the input/output request for the file, the reception apparatus refers to files in the file management computer, and if stub information which represents a link to another file system is stored in the file, the reception apparatus again transmits the input/output request to the file management computer storing the file at a destination of the link, and wherein if the file migrates between the file management computers or in the respective file management computers, the reception apparatus prepares the stub information to keep the link to the file at a migrating destination by an original file name.

9. A management computer capable of communicating through a network with a storage apparatus and file management computers which build file systems on volumes of the storage apparatus, comprising:

an interface;

a control device; and a memory storing a statistical information acquiring program which collects file system statistical information relating to allocated capacity for the respective file systems and storage apparatus statistical information relating to volume capacity of the storage apparatus; and an allocated capacity calculating program which causes the control device to calculates the allocated capacity to the respective file systems so that total available capacity of the file systems satisfies predetermined performance information, via the interface, the control device transmits a file system reducing instruction to the file system management computer which is among the plurality of the file systems and manages the file system whose allocated capacity is to be reduced, if the control device accepts, via the interface, a redistributing request for the allocated capacity of the file system; a volume capacity changing instruction to the storage apparatus based on the calculated allocated capacity, and a file system expanding instruction to the file system management computer which is among the plurality of the file management computers and manages the file system whose allocated capacity is to be expanded, wherein the file system statistical information includes identification data (ID) of the file system, identification data (ID) of the volume, the allocated capacity of the volumes, the available capacity of the volume, and a capacity consuming speed which is a speed consuming the capacity, wherein the storage apparatus statistical information includes the identification data (ID) of the volume, and the allocated capacity for the respective identification data (IDs) of the volume, and wherein the predetermined performance information is the capacity consuming speed.

10. A management computer according to claim 9, wherein the file system statistical information includes identification data (ID) of the file system; identification data (ID) of the volume; the allocated capacity of the volume; the available capacity of the volume; an access speed which is determined by a previous input/output speed, and a requested access speed, wherein the storage apparatus statistical information includes the identification data (ID) of the volume, the allocated capacity for the respective identification data (IDs) of the volumes, and wherein the predetermined performance information is the requested access speed.

* * * * *